(12) United States Patent
Mosur et al.

(10) Patent No.: US 12,177,277 B2
(45) Date of Patent: Dec. 24, 2024

(54) SYSTEM, APPARATUS, AND METHOD FOR STREAMING INPUT/OUTPUT DATA

(71) Applicant: Intel Corporation, Santa Clara, CA (US)

(72) Inventors: Lokpraveen Mosur, Gilbert, AZ (US); Ilango Ganga, Cupertino, CA (US); Robert Cone, Portland, OR (US); Kshitij Arun Doshi, Tempe, AZ (US); John J. Browne, Limerick (IE); Mark Debbage, Santa Clara, CA (US); Stephen Doyle, Ennis (IE); Patrick Fleming, Laois (IE); Doddaballapur Jayasimha, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 17/313,353

(22) Filed: May 6, 2021

(65) Prior Publication Data

US 2021/0281618 A1    Sep. 9, 2021

Related U.S. Application Data

(60) Provisional application No. 63/113,105, filed on Nov. 12, 2020.

(51) Int. Cl.
  *H04L 65/61* (2022.01)
  *H04L 47/50* (2022.01)
  *H04L 49/9005* (2022.01)

(52) U.S. Cl.
  CPC ............. *H04L 65/61* (2022.05); *H04L 47/50* (2013.01); *H04L 49/9005* (2013.01)

(58) Field of Classification Search
  CPC ..... H04L 65/61; H04L 47/50; H04L 47/2416; H04L 47/39; H04L 47/6255;
  (Continued)

(56) References Cited

U.S. PATENT DOCUMENTS 5,699,361 A * 12/1997 Ding .................. H04L 9/40
                                                    370/468
2001/0003193 A1   6/2001 Woodring et al.
(Continued)

FOREIGN PATENT DOCUMENTS

WO    2004072766 A2    8/2004

OTHER PUBLICATIONS

European Patent Office, Office Action mailed Mar. 18, 2022 in European Patent Application No. 21194690.0 (12 pages).
(Continued)

*Primary Examiner* — Schquita D Goodwin
*Assistant Examiner* — Mehulkumar J Shah
(74) *Attorney, Agent, or Firm* — Essential Patents Group, LLP; Christopher K. Gagne

(57) ABSTRACT

In one embodiment, a system includes a device and a host. The device includes a device stream buffer. The host includes a processor to execute at least a first application and a second application, a host stream buffer, and a host scheduler. The first application is associated with a first transmit streaming channel to stream first data from the first application to the device stream buffer. The first transmit streaming channel has a first allocated amount of buffer space in the device stream buffer. The host scheduler schedules enqueue of the first data from the first application to the first transmit streaming channel based at least in part on availability of space in the first allocated amount of buffer space in the device stream buffer. Other embodiments are described and claimed.

13 Claims, 24 Drawing Sheets

(58) Field of Classification Search
CPC ............... H04L 47/6275; H04L 47/621; H04L 49/9005; H04L 29/06; H04L 12/863; G06F 9/544; G06F 15/17; G06F 9/4881; G06F 9/5038; G06F 15/17306; G06F 2209/484; G06F 2209/5021
See application file for complete search history.

(56) References Cited

U.S. PATENT DOCUMENTS

| | | | |
|---|---|---|---|
| 2004/0160971 A1* | 8/2004 | Krause | H04L 47/564 370/412 |
| 2007/0025242 A1* | 2/2007 | Tsang | H04L 47/22 370/229 |
| 2013/0300655 A1* | 11/2013 | Cameron | G06F 9/5016 345/157 |
| 2017/0195259 A1* | 7/2017 | Florea | H04L 47/726 |
| 2018/0284873 A1* | 10/2018 | Appu | G06F 1/3225 |
| 2018/0300928 A1* | 10/2018 | Koker | G06F 12/00 |
| 2022/0210092 A1* | 6/2022 | Beecroft | H04L 47/52 |

OTHER PUBLICATIONS

European Patent Office, Communication Pursuant to Article 94(3) dated Sep. 5, 2024 in European Patent Application No. 21194690.0 (8 pages).

* cited by examiner

| Command | StreamOpen | Open a streaming channel |
|---|---|---|
| Input Parameters | PASID(s) | Address space(s) that will use the channel |
| | Resources | Any streaming channel resources to reserve for the channel. The resources reserved depend upon the intended use of the channel. |
| | Options | Optional channel features, e.g. mode, dedicated or shared, ... May be workload specific and include QOS parameters based on SLAs. |
| Output Parameters | Status | Indicates if the command was successful or had an error. |
| | Channel ID | Channel identifier to use in future commands for this channel. |

| Command | StreamClose | Close a streaming channel |
|---|---|---|
| Input Parameters | Channel ID | Channel to close |
| | PASID | Address space that is trying to close the channel |
| Output Parameters | Status | Indicates if the command was successful or had an error. |

FIG. 11A

| Command | StreamENQ | Enqueue data into a streaming channel (H2D transfer) |
|---|---|---|
| Input Parameters | Channel ID | Identifies the channel to use |
| | PASID | Address space that owns the data being sent |
| | Data Buffer Address or Source Data Registers | Data to send. For larger transfers, the data may be contained in a memory buffer while for smaller inline transfers, the data may reside in registers. |
| | Data Length | Length of data to enqueue |
| Output Parameters | Status | Indicates if the command was successful or had an error. When complete, the data buffer can be reused. |

| Command | StreamDEQ | Setup a future dequeue of data from a streaming channel (D2H transfer) |
|---|---|---|
| Input Parameters | Channel ID | Identifies the channel to use |
| | PASID | Address space that owns the destination buffer consuming the data |
| | Data Buffer Address or Source Data Registers | Optional memory buffer (for larger transfers) or target registers (for smaller transfers) where the dequeued data should be written to. |
| | Data Length | Length of data to enqueue |
| | Options | Additional options to optimize the transfer, e.g. transfer directly to DRAM and bypass cache. |
| Output Parameters | Status | Indicates if the command was successful or had an error. |

FIG. 11B

NON-TRANSITORY COMPUTER-READABLE STORAGE MEDIUM, AS MAY BE IMPLEMENTED IN EMBODIMENTS OF FIG. 13
1802

PROGRAMMING INSTRUCTIONS
TO CAUSE A DIGITAL CONTENT CONSUMPTION DEVICE, IN RESPONSE TO EXECUTION OF THE INSTRUCTIONS BY A PROCESSOR OF THE DIGITAL CONTENT CONSUMPTION DEVICE, TO PRACTICE ASPECTS OF EMBODIMENTS OF PORTIONS OF THE PROCESSES OF FIGS. 1- 12
1804

SYSTEM, APPARATUS, AND METHOD FOR STREAMING INPUT/OUTPUT DATA

This application claims priority to U.S. Provisional Patent Application No. 63/113,105, filed on Nov. 12, 2020, entitled STREAMING I/O ARCHITECTURE, the disclosure of which is hereby incorporated by reference.

TECHNICAL FIELD

Embodiments relate to data communications in a computer system.

BACKGROUND

Data communications between a Central Processing Unit (CPU) and other devices such as disks, network interface cards (NICs), field programmable gate arrays (FPGAs), accelerators, and the like currently operate using multiple back-and-forth coordination actions. Each of these actions last at least a few microseconds and may contribute toward the overall latency of the data transfer between the CPU and the other devices.

BRIEF DESCRIPTION OF THE DRAWINGS

FIG. 11A and FIG. 11B are examples of commands, input parameters, and output parameters to support a streaming channel architecture, in accordance with various embodiments.

FIG. 14 depicts a computer-readable storage medium that may be used in conjunction with the computing device, in accordance with various embodiments.

DETAILED DESCRIPTION

Figure 1:
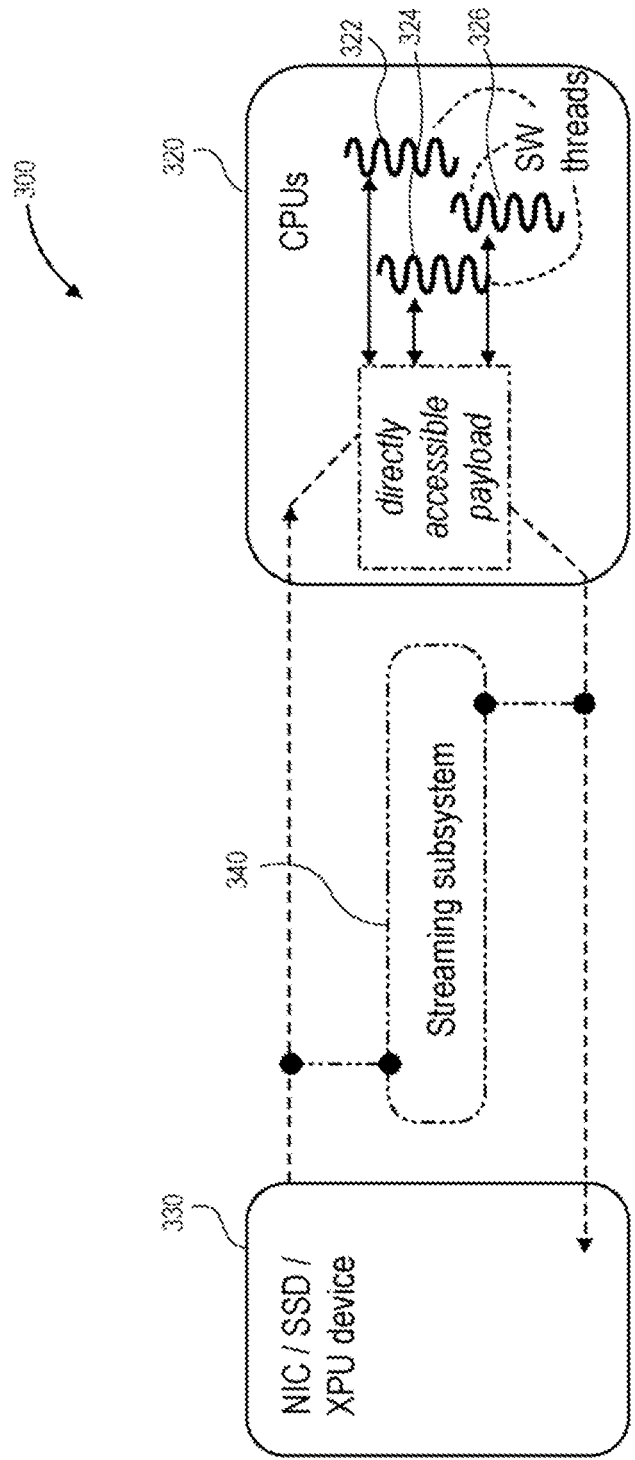
FIG. 1 is a block diagram representation of a system including a streaming subsystem in accordance with various embodiments.

Embodiments described herein may be directed to a streaming I/O architecture. Examples of this streaming I/O architecture may include data passing back and forth between a CPU and a device using a stream buffer that includes a streaming protocol, flow control, stream buffer format, scheduler, buffer manager, and exposure of an interface of the stream buffer to software including application software. These embodiments may reduce data-transfer latencies due to reducing the number of multiple interactions between interfaces found in legacy implementations, including PCIe legacy implementations. These embodiments may be a portion of a multi-terabit streaming data delivery technology. Embodiments may also be referred to as a low latency streaming channel architecture for data flows between processors and devices, or a streaming data delivery system (SDDS).

Embodiments described herein may serve as foundations for scale-out computing, in particular as the foundation for how software interacts with I/O devices such as network devices. These I/O devices may include network interface cards, storage devices, accelerators, and other similar devices. The legacy architecture for software-I/O interface was identified decades ago, and recently has created a data movement and processing problem for CPU devices regarding the transportation of data from assorted sources to assorted storage mediums. This data movement and processing problem will likely increase due to Ethernet technology reaching 400 Gb per second (Gbps) and likely going to 800 Gbps-1.6 terabits per second (Tb/s) in the near future that will be used to address emerging data center workloads such as artificial intelligence (AI), machine learning (ML), streaming services, and the like.

Legacy network latencies are starting to impact scale-out computing. At the microsecond timescale, software scheduling approaches may be too coarse-grained and impractical, while hardware-based approaches may require too many resources towards masking latencies of data movements and various associated coordination operations. Recently there is a microservices trend, particularly in cloud computing, data center computing, and edge computing to refactor large applications into many smaller parts, called microservices, that can be independently developed, improved, load-balanced, scaled, etc., and to perform the work of the large applications by communicating messages among the microservices or performing inter-microservices procedure calls. The different parts of a large application so refactored into microservices may then be placed, replicated, etc. independently of each other, on multiple machines connected by networks, or interact with one another through data they update on distributed storage devices. This increases inter-machine and inter-device data movement and processing, which exacerbates the data movement and processing delays by hundreds of times, and further burdens computational devices like CPUs, GPUs, etc. with additional code for performing the inter-device and inter-machine data movements and waiting for such data movements to be completed. In other emerging areas such as Internet-of-Things (IoT) computing which exhibit high degree of device-to-device communications, a similar data movement and processing bottleneck limits the speed and scale of solving problems by using custom off-the-shelf components, and necessitates the use of costly, hard-to-scale, specially designed components and software.

Large-scale micro-services trends, exascale computing and data storage, edge computing, 5G, network function virtualization, disaggregation within the data center, heterogeneous programming, with the advent of accelerators, smart storage, data center fabrics and the like, are all creating pressure on the "last inch" of data transfers to and from CPUs in legacy implementations. The "last inch" refers to the coordination within a machine between any device that needs to send or receive data to or from a software task that respectively consumes or produces the data piece by piece, or in various units of packets, messages, pages, blocks, etc.

These legacy implementations are across devices from high-throughput disaggregated storage elements, to 12+ terabytes switches, and high-speed NICs. Simultaneously, AI-enabled real-time computations continue to drive per-capita data creation and consumption. In addition, data operations around billions of Internet of things (IoT) devices are experiencing a similar problem with legacy implementations, that may affect machine to machine (M2M) communications, storage, data filtering, time-series analytics, and so on. Data is being produced on the scale of petabytes per second and has to be moved, processed, filtered, cleaned, and organized for computation through large scale parallel and distributed computations. As these, and other, computations become ubiquitous, high speed and efficient data transfer has become increasingly important.

These legacy I/O architecture implementations often have difficulty achieving very low latencies and very high throughputs because of their need to cross back and forth between load store semantics of processor-based computations and I/O semantics of data-transfer operations between CPUs and such devices as disks, NICs, or even specialized computing devices like FPGAs, or accelerators operating from their own private high-speed memories.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (Band C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Referring to FIG. 1 a block diagram representation of a system 300 including a streaming subsystem 340 in accordance with various embodiments is shown. The streaming subsystem 340 is configured to handle exchange of data between processors and devices, in accordance with various embodiments. A CPU 320 is coupled to an I/O device 330 via a streaming subsystem 340. In embodiments, the CPU 320 may be multiple CPUs. In embodiments, the CPU 320 may have multiple cores running multiple software threads 322, 324, 326. In embodiments, the I/O device 330 may be a NIC, a solid-state drive (SSD), or the like. In embodiments, the I/O device 330 may be a XPU device that may be a CPU, a graphics processor unit (GPU), a field-programmable gate array (FPGA), or some other device.

Embodiments, unlike legacy implementations that may use packet processing and converting from I/O to memory I/O, operate directly from/to data streams using the streaming subsystem 340. The streaming subsystem 340 is an interface that presents a streaming channel to the CPU 320.

The streaming subsystem 340 includes hardware assists and acceleration mechanisms to produce an abstraction made seamless to an application 322, 324, 326 running on, for example, the CPU 320. The I/O device 330 is configured to use the streaming subsystem 340 as a bidirectional communication peer to the CPU 320.

In embodiments, streaming data via the streaming subsystem 340 may be a first-class operation limited by capacity exhaustion in the abstracted channels (described further below) of the streaming subsystem 340 that links producers of data, such as the CPU 320 and the I/O device 330, to consumers of data such as the CPU 320 and the I/O device 330.

The architecture described by conceptual diagram 300 may target delivering multi-terabits with low latency at a high multithreading and a multiprogramming scale under an abstracted synchronous programming model that does not involve queueing and does not cause loss in the routine cases. Examples of exceptional or infrequent cases include, but are not limited to, a congested buffer that impacts communications between the CPU 320 and the I/O device 330, a congested processor or device that cannot keep up with the device or processor, and a condition in which software is handling a rare event such as a page fault and is unable to perform timely actions to keep its I/O actions streamlined. In embodiments, the application 322, 324, 326 does not know or care that it is talking to an I/O device 330, and instead uses memory-like semantics to access data when it is needed.

Figure 2:
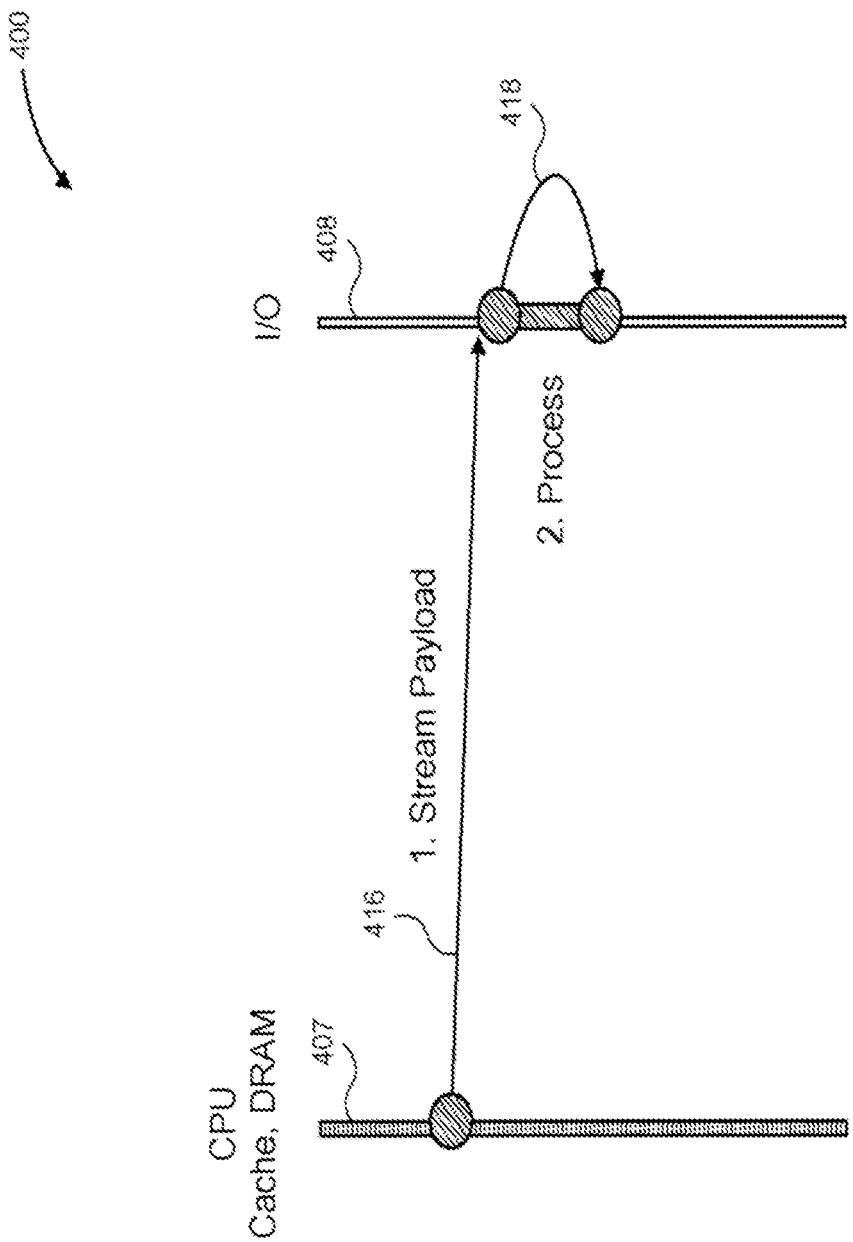
FIG. 2 is a diagram illustrating a streaming interface with memory semantics in accordance with various embodiments.

Referring to FIG. 2, a diagram 400 illustrating a streaming interface with memory semantics, in accordance with various embodiments is shown. The diagram 400 shows coordination between the CPU 407 and the I/O device 408. The CPU 407 may be similar to the CPU 320 and the I/O device 408 may be similar to the I/O device 330. In embodiments, the CPU 407 is configured to provide a stream payload 416 to the I/O device 408 and the I/O device 408 is configured to process the payload 418.

Legacy systems often include hundreds of different interactions for a complex payload. The streaming architecture of the diagram 400 may reduce the hundreds of interactions typically performed by legacy systems to a one-action interaction example of the diagram 400. This one-action interaction may be considered a logical one-action interaction. In embodiments, the one action interaction may be broken into smaller pieces for efficiency, but unless there is a scarcity of CPU cycles, latency dilation of the interaction typically does not occur.

Figure 3:
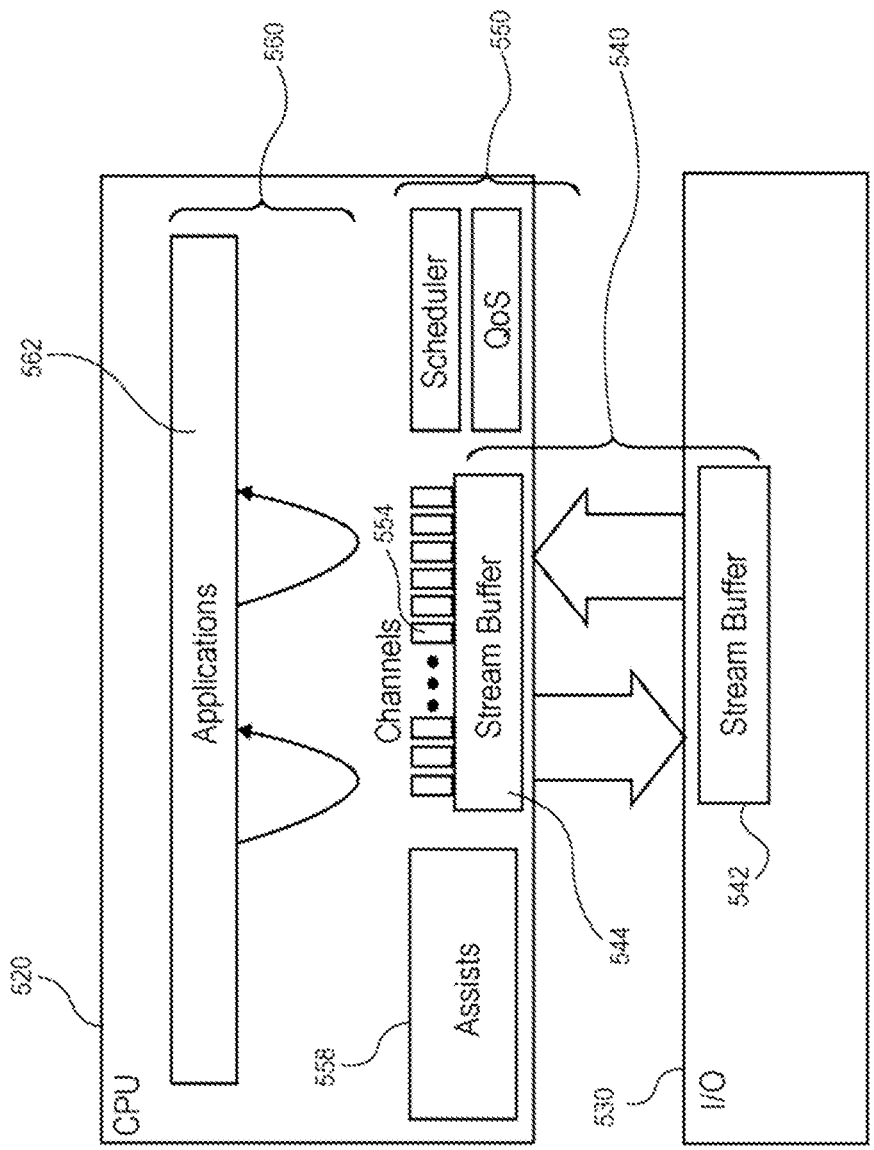
FIG. 3 is a block diagram representation of a system including a streaming subsystem in accordance with various embodiments.

Referring to FIG. 3, a block diagram representation of a system including a streaming subsystem 340 in accordance with various embodiments is shown. The CPU 520 may be similar to the CPU 320, 407 and the I/O device 530 may be similar to the I/O device 330, 418. In embodiments, the streaming channel architecture, also referred to as the streaming subsystem 340, includes hardware components and a software host interface. In embodiments, the architecture as shown in FIG. 3 includes three functional areas. The first functional area is a streaming protocol functional area 540 that may be implemented as an interface using the uncore (not shown) which is a part of CPU 520), and the I/O device 530. The streaming protocol functional area 540 includes a stream buffer 542 that may be part of the I/O device 530 and a stream buffer 544 that may be part of the CPU 520. In embodiments, the uncore includes functions of a microprocessor that are not in the core, but are closely connected to the core to achieve high performance. The uncore may also be referred to as a "system agent." The streaming protocol functional area 540 is configured to employ the stream buffers 542, 544 to implement flow control between the two stream buffers 542, 544 and support a stream buffer format.

The second functional area is an exposed stream buffer to software functional area 550, which may be implemented in the uncore. In an embodiment, the exposed stream buffer to software functional area 550 includes the streaming channels 554, the scheduler, the QoS, and assists 558. In embodiments the exposed stream buffer to software functional area 550 will expose the stream buffers 542, 544 as streaming channels 554 that are available to the applications 562. The exposed stream buffer to software functional area 550 may also perform as a scheduler for compute and I/O (as discussed further with respect to FIG. 4 below) and provide buffer management functionality and other assists 558.

The third functional area is an enabled synchronous memory semantics functional area 560 that may be implemented at the instruction set architecture (ISA) level. The enabled synchronous memory semantics functional area 560 may include data streaming. In an embodiment, the data streaming includes enqueuing and dequeuing data, and implementing optional zero-copy ownership. In embodiments, they may achieve zero copy for the enqueue and dequeue operations through special instructions added to the CPUs, as described in FIGS. 7A-7C.

Embodiments may include various hardware assists 558 for managing buffers and for performing various canonical operations. These canonical operations may include unpacking data from headers or payloads and placing it into a desired, e.g. deserialized format, or translating, e.g. from an unserialized format into a serialized format; for selecting data elements and composing new data elements from them (e.g., performing a gather or a scatter operation); and/or for presenting data to applications as logically contiguous streams while recording packet and message boundaries in auxiliary data structures. Such canonical operations obviate data transformations, may remove or hide management of various I/O descriptors, and may automate operations like compression, encryption, decompression, and decryption in hardware.

In embodiments, the streaming I/O architecture, also referred to as the streaming subsystem 340, contains streaming channels 554 which are composed from three implementations to legacy implementations: stream buffers 542, 544, Streaming Instruction Set Architecture (ISA) instructions, and a stream buffer I/O protocol.

Stream Buffer

The stream buffer may be implemented using capacities available in processor caches, memory-side caches (e.g., L4), and memory associated with the CPU 520. In embodiments, the memory may be backed up with DRAM. In embodiments, the stream buffers may be partitioned into virtual cues, similar to an I/O device.

Stream buffers are implemented at the CPU 520 via the stream buffer 544, and at the I/O device 530 via the stream buffer 542. By this implementation, each stream buffer 542, 544 may funnel data in or funnel out data that it sends to/receives from the other. Data may flow smoothly in either direction, from the CPU 520 to the I/O device 530 or vice versa, with flow control implemented by various policy mechanisms described below with respect to streaming I/O buffer protocol.

Streaming Instruction Set Architecture (ISA) Instructions

The ISA instructions enable enqueue and dequeue of data by the application 562 to and from a streaming channel 554 channel. In embodiments, they may achieve zero copy for the enqueue and dequeue operations through special instructions added to the CPUs, as described in FIGS. 7A-7C. In embodiments, these instructions advance from legacy application integration architecture (AIA) queuing instructions because they are stream oriented and include the logic to cause automatic actions such as credit management, buffer space and descriptor management, hooking in various data transformation, and control steering operations. These instructions may be implemented in hardware or redirected to a combination of hardware and emulating software in different generations of implementation.

Streaming I/O Buffer Protocol

Existing PCIe electricals can be used running extensions of PCIe, compute express link (CXL), or combined with a streaming channel protocol. In embodiments, a streaming message protocol allows source data to be pushed to the destination including PCIe bus, device, and function (BDF), Process Address Space ID (PASID), stream payload, and meta data. The streaming I/O buffer operates in two directions, from the I/O device 530 to the CPU 520 and from the CPU 520 to the I/O device 530.

Streaming Channels

In embodiments, the stream buffer 544 is organized into multiple streaming channels 554. In other words, a multi-channel abstraction is overlaid on the stream buffer 544 so the streaming subsystem 340 presents a plurality of streaming channels 554 between a producing end, such as the CPU 520, and a consuming end, such as the I/O device 530, bi-directionally. The streaming channels 554 may have different rates of flow and different amounts of buffering, so that different classes of service can be constructed for shared but flexibly partitioned use of the stream buffer 554 among the different usages.

In embodiments, the streaming channels 554 may be accessed directly from software, for example found in the applications 562. In embodiments, the application 562 can retrieve data from the streaming channels 554 or insert data into the streaming channels 554 directly by using instructions "streaming enqueue" and "streaming dequeue" as discussed above. These instructions work in concert with the logic in the streaming I/O buffer protocol that manages the streaming channels 554 and the stream buffers 542, 544. The instructions and the logic that manages the streaming channels 554 and the stream buffers 542, 544 present an abstraction of a virtually contiguous space to access from the CPU-based software, even if different streaming channels 554 get different amounts of space in the stream buffers 542, 544, and even if the space that any given streaming channel 554 gets in the stream buffer 542, 544 is not physically contiguous.

While repeat accesses to a streaming channel 554 may produce/consume data in the streaming channel (respectively for egress and ingress), application 562 can also peek into a streaming channel 554 without changing the position of production or consumption, thus permitting a controlled amount of random access.

In addition, embodiments may include streaming instructions that perform multi-element transfers between (to/from) various architectural registers of a processor (not shown) and named elements in the stream buffer 542, 544. An offset in the stream buffer 542, 544 where a named element resides may be determined automatically by hardware that keeps track of the shifting logical packet and message boundaries in the streaming channel 554 as the data in the streaming channel 554 is produced or consumed. These multi-element transfers may be performed in one-shot whenever a certain condition is detected, e.g. when a header pointer moves past a logical packet boundary.

This permits the CPU-based software to implement iterators over the streaming channels 554 without having to maintain packet and message boundary information through software code.

Embodiments may include streaming instructions that perform automatic bulk transfer from/to a given streaming channel 554 to/from memory (not shown), e.g. bypassing bringing data into the CPUs 520 during ingress, and issue a directed move of data from memory directly into a set of offsets in a streaming channel 554.

Micro-architectural provisions and instruction options may support copy-free or reduced-copy transmission of data between the I/O devices 530 and the CPU 520. For example, data communicated via the stream buffers 542, 544 into or out of memory space may not go through a kernel-based networking stack, except, for example, for compatibility with legacy software.

Thus, software and runtimes designed according to embodiments of the streaming subsystem 340, do not have to move data between kernel managed buffers and user-accessible ranges in each application. Embodiments may achieve copy-free or reduced-copy transmission by a layer of indirection in which ranges of logical offsets into a streaming channel 554 that are used by a streaming-enqueue or streaming-dequeue operation are translated in hardware into a set of memory addresses that are in application address spaces.

Streaming enqueue and dequeue operations may also incorporate event signaling to application 562 directly through memory (not shown). Thus, instead of performing notifications through PCIe registers, e.g. via doorbells, and completion notifications, the software and device driver together configure addresses in cacheable memory where such event signals can be received or sent, by using ordinary load-store operations. Thus, legacy polling may simplify to checking a memory address, and legacy notifying may simplify to storing in a memory address.

In embodiments, the application 562 or OS/runtime software may use variants of UMONITOR and UMWAIT to poll on such memory locations without actively executing the instructions. Alternative embodiments may include the ability to poll on more than one memory location, which may be equivalent to a non-instruction version of select system call.

Alternative embodiments may further provide the ability to poll, on one or many locations, using a hardware means without parking a kernel thread. Other embodiments may provide the ability for the hardware polling to activate an automatic light-weight callback. The automatic light-weight callback may include saving a designated subset of general-purpose registers (GPRs), typically, rax, rsp, rip, and/or rbp, and branching to a software specified address within the same application address space. The automatic light-weight call back may also include a software epilogue at the target address to perform any further spilling and filling of registers it needs to repurpose.

In embodiments, a nonlocal return at the end of the software posted with respect to light-weight callback may return control to the preempted thread when the callback is complete. This may be accomplished by ensuring that the event that is delivered through the streaming channel 554 is directed at a CPU 520 that has a parked thread context that is ready to receive such a notification.

In embodiments, a preferred style of the callback code may be run-to-completion and continuation-based execution. Alternative embodiments may include locations that are not in DRAM but in a low latency register file that is accessible from the CPU 520.

Agile Multiplexing of Resources

Figure 4:
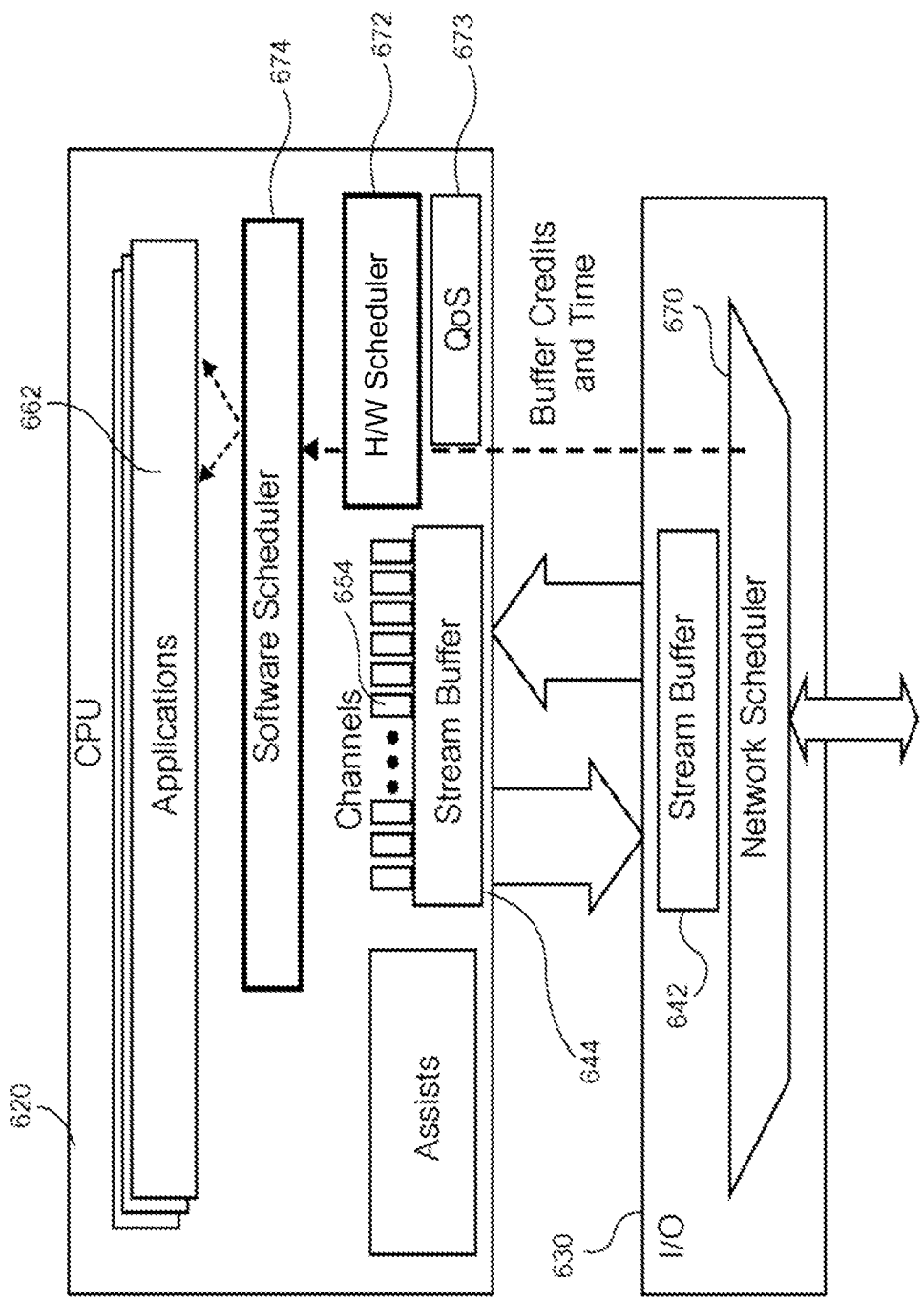
FIG. 4 is a block diagram representation of a system including a streaming subsystem in accordance with various embodiments.

Referring to FIG. 4, a block diagram representation of a streaming subsystem 340, in accordance with various embodiments is shown. FIG. 4 shows details of a scheduler within the streaming subsystem 340, in accordance with various embodiments. The streaming subsystem 340 includes three features that are described below on agile multiplexing of resources. These three features include a hardware (H/W) scheduler 672, a software scheduler 674 that performs cooperative software thread scheduling through a credits-based feedback and flow control, and quality of service (QOS) 673. Some components shown in FIG. 4 may be similar to components in FIG. 3, in particular the CPU 620, the I/O device 630, the stream buffers 642, 644, the streaming channels 654, and the application 662 may be similar, respectively, to the CPU 520, the I/O device 530, the stream buffers 542, 544, the streaming channels 554, and the application 562.

The components described operate in a cooperative manner so that any limited physical resources, e.g. chiefly buffer capacity in the streaming channel 654, processor cycles in CPUs 620, processor cache capacities (not shown), may achieve effective utilization through coordination of processing over streaming data. In particular, rather than applications 662 polling for data, applications 662 are propelled forward in their work based on data. Propelling forward includes moving forward automatically as data becomes available, instead of having to be notified and awakened from a waiting state and having to interact with an operating system in order to be set in executing mode. Similarly, instead of pushing data into the stream buffers 642, 644 when there is not enough room (which may cause stalls, or premature eviction of data into memory, and in general, both), the producer end and the consumer end of a streaming channel 654 have their rates brought into alignment by feedback-driven scheduling of operations at the two ends.

FIG. 4 illustrates how a network interface, the streaming channels 654, the stream buffers 642, 644, hardware data, and event delivery subsystem work in concert with the software scheduler 674 and applications 662. For simplicity, FIG. 4 illustrates the case for ingress traffic, and, even though it uses a networking I/O device 630 as example, the solution concepts apply equally to other interfaces (storage, accelerators, etc.).

In an embodiment the H/W scheduler 672 is a hardware micro scheduler engine 672. The hardware micro scheduler engine 672 may be referred to as a micro scheduler or µs. The hardware scheduler 672 may be implemented as extension of core CPU 620 microarchitecture. The hardware micro scheduler engine 672 may be triggered based on programmed conditions it monitors. When triggered, the hardware micro scheduler engine 672 causes a context switch on a designated thread, or application 662. The context switch may be an intra-address space switch to an anonymous thread that has just a few GPRs (rax, rsp, rbp, and rip), and which shares, with the currently running thread on the target CPU 620, the address space context of the same application. Thus, the context switch can be thought of as an extremely lightweight trap, but one which does not cause transfer of control to a kernel entity. The conditions for causing this transfer of control may include but are not limited to: (a) write to a monitored memory location, or (b) satisfaction of some monitored condition. A monitored condition may include the distance between a production offset in a streaming channel 654 and a consumption offset in the streaming channel 654 exceeding a threshold, or the elapsing of a threshold number of microseconds since the last triggering of the hardware micro scheduler engine 672.

Cooperative Software Thread Scheduling Through Credits-Based Feedback and Flow Control In legacy implementations, software thread scheduling, e.g. scheduling of an application 662 in response to an I/O event, is generally in response to an event monitored by software, either by polling, or by a wakeup generated in an interrupt service routine. Both mechanisms are coarse-grained in different ways. Interrupt driven execution incurs inefficiencies across the stack and is often limited to a low frequency for efficiency. Polling incurs busy-waiting, and thus cannot be undertaken from every core all the time.

Coarse grained polling and interrupt-driven execution each may create challenges of delays and uncoordinated scheduling in legacy implementations. In particular, software schedulers may dispatch application actions too late to prevent data from overflowing the streaming channel falling into memory on ingress, or, not producing egress data quickly enough when a peer device has the spare capacity to absorb it.

In embodiments, metadata is created that can be employed by each end of the streaming channel 654 to produce memory mapped or register mapped views of the available streaming channel 654 capacity so that the software scheduler 674 can adapt application scheduling strategies proactively as the available channel 654 capacity strays too far in the direction of too slow or too fast a consumption rate in relation to a production rate.

In embodiments, the QoS 673, also shown in FIG. 3, adds capabilities to current generation and roadmap resource director technology (RDT). In embodiments, for example, for different applications 662 with different service quality objectives, the QoS 673 provides for fine-grained, agile prioritization of stream buffer resources for greater volume of buffering provisioned to higher priority streaming channels 654, such as those used for high bandwidth video streaming, live virtual machine (VM) migration, large scale AI/ML training, etc. In embodiments, the QoS 673 also makes available to each streaming channel 654 a greater number of credits for implementing, for example, leaky bucket protocol, for transferring more data per unit of time and at low latency between the CPU 620 and the I/O devices 630. Other QoS 673 capabilities include greater allocation of processor cycles, and preferential retention of data that is either created in, or brought into, L1 and L2 caches by higher priority streaming channel application threads.

In embodiments, QoS 674 capabilities may also include firewalling a defined fraction of cache capacity (in L1, L2) and that of other competitively allocated processing resources, for example, physical register files, translation lookaside buffer (TLB) entries, branch target buffer (BTB) entries, etc., for ensuring that such (for example high priority) streaming channel usages do not suffer resource starvation when their applications 662 are scheduled either by the hardware scheduler 672 or by a software scheduler 674.

Example Integrated Operation of Components in a Resource-Unconstrained Case

In a resource-unconstrained case, whenever an I/O device 630 needs to send data to a CPU 620, if there is sufficient capacity available in the streaming channel 654 the I/O device 630 can proceed. The same is the case in the reverse direction. Further, in the unconstrained case, the CPU 620 is available for the data-receiving or data-sending threads to be scheduled, respectively for consuming or producing the data at the CPU 620. The streaming channel 654 simply carves out progressively the capacity needed in the buffer, uses it for holding content, while indicating the schedulers, the hardware scheduler 672 or the software scheduler 674 through memory or register based indications (e.g., via updating status flags, and/or data- or capacity-available metrics).

In the ingress case, the data consumption (receiving and processing) by the CPU 620 keeps up with the rate of inflow from the I/O device 630 or the rate of inflow is managed at the devices by feedback from the CPU 620 through the streaming channels 654 to a producing device 630. For the egress case, data going the other way that is produced at the CPU 620 and flows to the I/O device 630, the treatment is similar, except that the rate of production of data at the CPU 620: (a) is kept in check so that the available capacity in the streaming channel 654 is not exhausted prematurely, and (b) is kept high enough so that the device does not idle while there is still sufficient streaming channel 654 capacity so that the CPU 620 is not buffer capacity limited.

In embodiments, for the ingress case, the application 662 that gets scheduled to receive and process the data uses instructions to access the data from the streaming channel 654.

Addresses used may be relative to a logical offset from the start of a known position in the stream. That offset distance is translated into a logical channel address which in turn is mapped to a logical stream buffer address. In ideal conditions, that stream buffer address refers to a cache line in the processor cache hierarchy (such as L1, or L2).

The access to data thus proceeds without any effort from the software to compute an effective memory address of the offset in question and any effort in software to manage the memory for receiving the data. The data of interest is ideally found in L1 or L2, and a bulk register-load instruction may simply populate various GPRs with a plurality of data items that are compactly described in the bulk-register-load instruction. In the case that L1 or L2 have exhausted a near-term capacity threshold, they may evict some cache lines and the data of interest may lie in those evicted cache lines. Accordingly, an access may then proceed into L3, L4, or ultimately into memory, in the case of capacity being overrun due to the producer of data running at a rate higher than ideal for the receiver of the data. Software scheduling policies may accordingly assign a higher a fraction of CPU bandwidth and make more L1 or L2 cache capacity available. This may be determined by the programming of the QoS 673 module. Separately and concurrently, the hardware scheduler 672 computes an ideal rate of production and provides an indication that the receiver cannot proceed at the current rate of the sender, and that the sender is to reduce the rate of sending or stop, to the I/O device 630, so that its rate of sending is reduced.

Note that such flow adjustments are performed in legacy implementations so that a NIC does not run ahead of an amount of capacity available in the NIC, e.g. dropping packets when capacity is exceeded. The NIC may either notify a CPU through interrupts, or passively update the queued packet count at a PCIe register if it is in polled mode, but the remainder of the flow control responsibility lies in software (OS or application, or both). In contrast, embodiments herein automate as much of that legacy process as possible, and, while embodiments may resort to dropping packets under buffer exhaustion conditions, in the common case, embodiments remove the burden of managing the flow and converting from packets and packet-offsets to logical stream offsets and vice versa from instructions in software.

Example Integrated Operation of Components in a Resource Limited Case

Next consider the case of resource limitations, where there is, for example, a limited number of applications 662 at the CPU 620 that are running and consuming (or producing) data for the different streaming channels 654. The number of streaming channels 654, which may also be referred to as connections, may be far in excess of the number of applications 662. However, only a certain number of those streaming channels 654 may be producing data so quickly that corresponding applications 662 need to be constantly available to drain, or, in the reverse case, consuming data so quickly that applications 662 threads need to be constantly available to fill.

In embodiments, the common case is handled by the agile multiplexing of threads, or applications 662, in response to channel activity so that more threads can multiplex efficiently over the number of logical hardware threads, just in time. However, if the available (or policy-rationed) hardware contexts is insufficient to keep the number of software threads in execution concurrently, then those software threads that support latency critical, high bandwidth operations get priority in a software scheduler 674, while best-effort applications get their consumption throttled by their streaming channels 654 reaching saturation and either spilling data from caches into memory, or discarding packets. In embodiments, for any applications that cannot accept packet loss, the streaming I/O architecture may use the larger capacity of DRAM to hold incoming data, but, this is at the cost of the best-effort application slowing down as it has to encounter cache misses in larger numbers. That, in turn, triggers higher level end-to-end flow control protocols, e.g. explicit congestion notification, round-trip delay time (RTT)-based TIMELY protocol, etc.

Returning now to FIG. 3, which may also be referred to as describing a SDDS, defines a streaming subsystem 340 optimized for streaming data between the CPUs, 520, and the I/O devices 530 with ultra-low overhead and high efficiency. Legacy doorbell, descriptor, and data phases of I/O transfers are, in embodiments, streamlined into a "push flow" initiated by the source of the data transfer. The CPU 524 transmits the flow, and the I/O device 534 receives the flow. In embodiments, the streaming channel 554 supports a unidirectional flow of streaming data with first in first out (FIFO) ordering. In embodiments, supported flow directions include host-to-device (H2D), and device-to-host (D2H) flow directions. In other embodiments, supported directions may include host-to-host (H2H) and device-to-device (D2D). The principles of operation for H2H and D2D may be similar to those for H2D and D2H.

Multiple streaming channels 554 may be supported by carving up and dynamically managing an aggregate amount of capacity in various caching structures, which may include processor caches, memory side caches, on-device buffering, etc., that are backed transparently by an area of physical memory for overflow. These physical areas are depicted as stream buffers 542, 544 that are present at both hardware peers.

In embodiments, the stream buffers 542, 544 are exposed to software. Buffer resources are assigned dynamically to streaming channels 554 based on the scheduling of transfers so that the resources can be efficiently shared. Buffer resources can also be dedicated using "pre-scheduling" to reduce latency for latency-sensitive use cases. In embodiments, the sharing of buffer resources is managed by a credit scheme to avoid head of line blocking across streaming channels 554. This means that when a destination end is not sinking the data in the streaming channel 554 as it is being pushed into the streaming channel 554 from the source end at a sufficiently high rate, the high throughput caching resources available to that streaming channel 554 are reduced automatically. In that case, the portion of the capacity available in the streaming buffer to that streaming channel 554 is restrained, so that other streaming channels 554 from which the data is being drained swiftly by those streaming channel receivers have the sufficient caching or buffering resources they need to sustain their high rates of dataflow. In embodiments, changes proposed to the host architecture, for example CPU 520, but not limited to CPU 520, may allow streaming channels 554 to be accessed directly from applications 562, and/or may allow data flows in streaming channels 554 to drive just-in-time, agile thread or application scheduling. In embodiments, SDDS will be layered on top of existing I/O standards such as PCIe and CXL.

Figure 5:
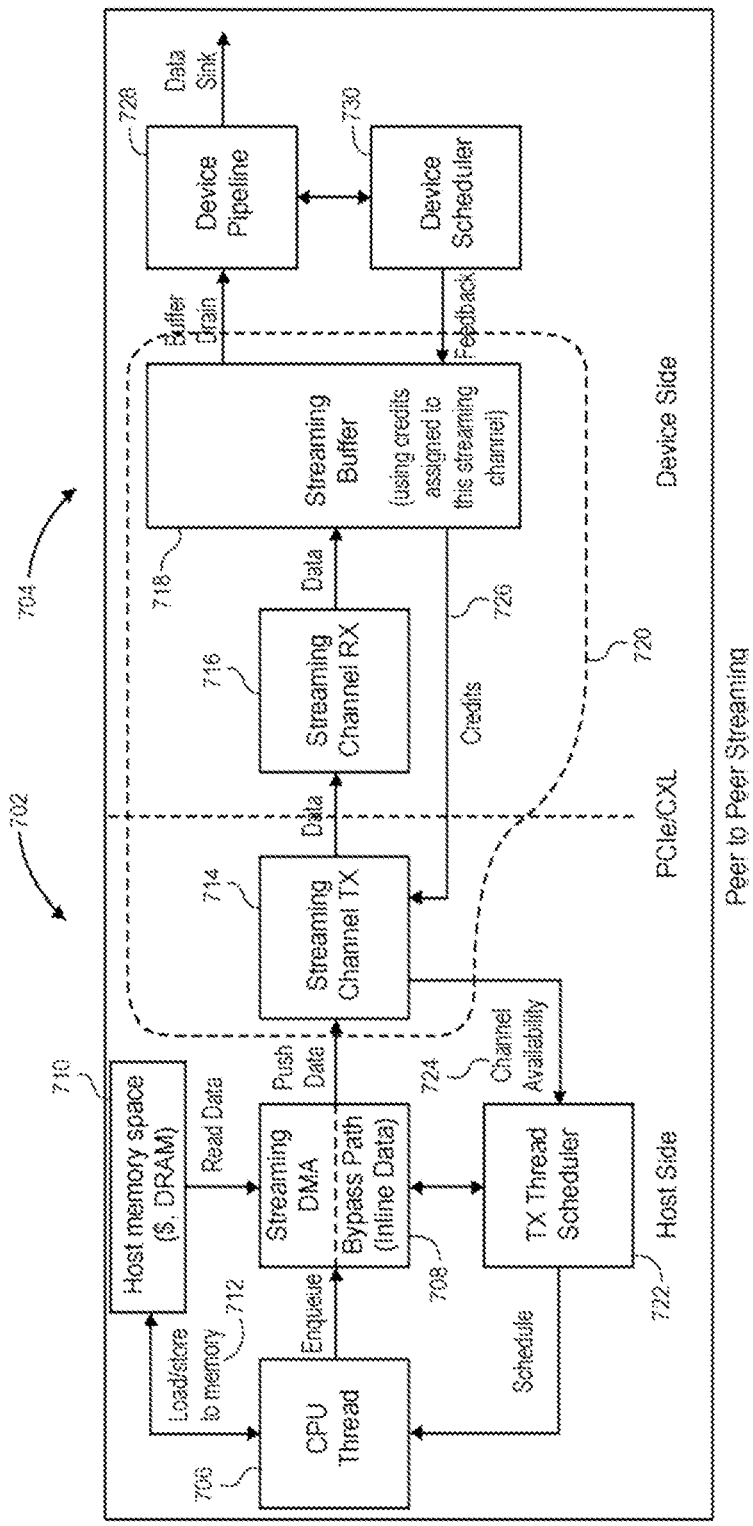
FIG. 5 is a block diagram representation of a peer-to-peer streaming flow via a streaming subsystem in accordance with various embodiments.

Referring to FIG. 5, a block diagram representation of a peer-to-peer streaming flow via a streaming subsystem 340 in accordance with various embodiments is shown. The peers 702, 704 that communicate over a streaming channel and the various supporting interfaces between them are described in FIG. 5. On the left-hand side is one peer 702, that is referred to as a host, and on the right-hand side 704 is the other peer, that is referred to as a device. The host 702 and the device 704 roles are generic, as clarified below.

In embodiments, this concept may be illustrated using a Ethernet NIC interfacing to network software, but it may be ported to other devices such as accelerators and/or storage.

Even though the host 702 shown is a CPU device, and the streaming is shown to be between a CPU thread 706 on the host 702 and the NIC 704, the host 702 can be a non-CPU host, such as a GPU or a combination of a CPU and an integrated GPU.

Also, while the interaction from the host side 702 is performed by a CPU thread 706 executing instructions, this is not meant to exclude other non-software based forms of logic performing this role, such as, from a macro-operation, such as a Tensor operation performed by an embedded tensor unit, a video encode/decode operation performed by a video encode/decode unit within a specialized CPU, a GPU, or an ASIC may be the computation agent that is performing the transmit/receive operations.

In embodiments, the NIC 704 device may be a seat of computation as well. For example, a smart NIC may sometimes act as host, and communicate with a receiving thread or operation of computation on a CPU or a GPU, where the receiving thread/operation may be operating in a "device" role against the host role of a smart NIC. For example, the receiving thread/operation may emulate a virtualized storage or data communicator device. For example, such a device could be a software-virtualized network switch (e.g. a 'vSwitch') and may act to filter, route, buffer, and forward data from the streaming channel to other hardware or software entities in the system.

Thus, the concept of a H2D or peer to peer (P2P) streaming channel between a CPU (running software threads or applications) in the role of a host 720 and a network interface card in the role of a device 704 is not limited to this configuration, even though host actions are described as CPU actions performed by a software thread 706 and device actions using a NIC are used as the representative device in FIG. 5.

Enqueue ISA (Enhanced)

In embodiments, data transfers are initiated by software running in a CPU thread 706, such as for example an application, using an enhanced enqueue ISA. In embodiments, the enqueue operations can contain inline data to optimize smaller transfers involving low latency and high operation rates. Enqueue operations may also specify descriptors for non-inline data, for normal or larger transfers. Larger transfers may use a streaming DMA engine 708 to read data from the host memory space 710 and can be fulfilled from cache or from DRAM. Such data may be brought into the host memory space 710 from elsewhere, e.g. using a file system, or using a mapping operation to a file, disk, or any other source, or may be produced in memory by actions of the CPU e.g., shown as load/store operations 712. Both paths result in data being streamed to the transmit (TX) side of the streaming channel 714 in the H2D direction.

To enable data to be streamed between the source and the destination, a message format allows for data to be streamed at larger sizes, e.g. 4 KB vs. legacy PCIe write operations that typically have a maximum payload size of 512B. this also applies to D2H transfers described below.

Channel Operation and Scheduling in H2D Direction

The H2D streaming channel 720 includes a TX logic/data path 714 on the host side, a RX logic/datapath 716 on the device side, and a stream buffer 718 on the device side that is shared by all H2D streaming channels. In embodiments, the streaming channel 720 is layered on top of an underlying I/O standard such as PCIe or CXL.

Credit Flow and Feedback from Device

The streaming channel 720 can give feedback, such as credit availability, to the TX thread scheduler 722. The TX thread scheduler 722 can decide when to schedule threads based on channel availability 724 and based on queue depth for enqueued operations from the CPU thread (or CPU thread group) 706 that is sending data into the channel 720. Thus, for example, a thread that is closer to the head of the queue has a higher likelihood of getting scheduled, compared to a thread that is further behind it.

In embodiments, the stream buffer 718 is partitioned into credits 726, and the credits 726 may be assigned to TX streaming channels 714 based on their transfers and configuration. In embodiments, the transmit streaming channel 714 may only transfer data into the RX streaming channel 716 when it has enough credits for the transfer. This enables the data to be received at the stream buffer 718, and avoids back-pressure in the I/O interface to maintain forward progress and avoid head of line blocking across streaming channels. When the device pipeline 728 drains the data out of the stream buffer 718, the credits can be returned to the transmit streaming channel 714 for future data transfers.

In an embodiment, the device architecture shown in FIG. 5 is device/product specific for a networking device. The device architecture is conceptually represented by a device pipeline 728 and an optional device scheduler 730. In alternative embodiments, device architectures may have their own device-specific scheduling algorithms and scheduling requirements. For example, a NIC may have sophisticated network egress scheduling algorithms based on internal NIC state and configuration parameters. The device stream buffer 718 is of bounded capacity and supports efficient streaming of packets through the architecture without head of line blocking and unnecessary delay. To participate and get full benefit, a device at the receive side would implement a feedback path from device-side scheduling 730, through the credit mechanism, to the host-side TX thread scheduler 722, to ensure that the buffer is not exhausted on both sides, the stream buffer 718 on the device side, and a buffer (not shown) on the host side.

D2H Streaming Channel Flows (the Device to Host Path)

Figure 6:
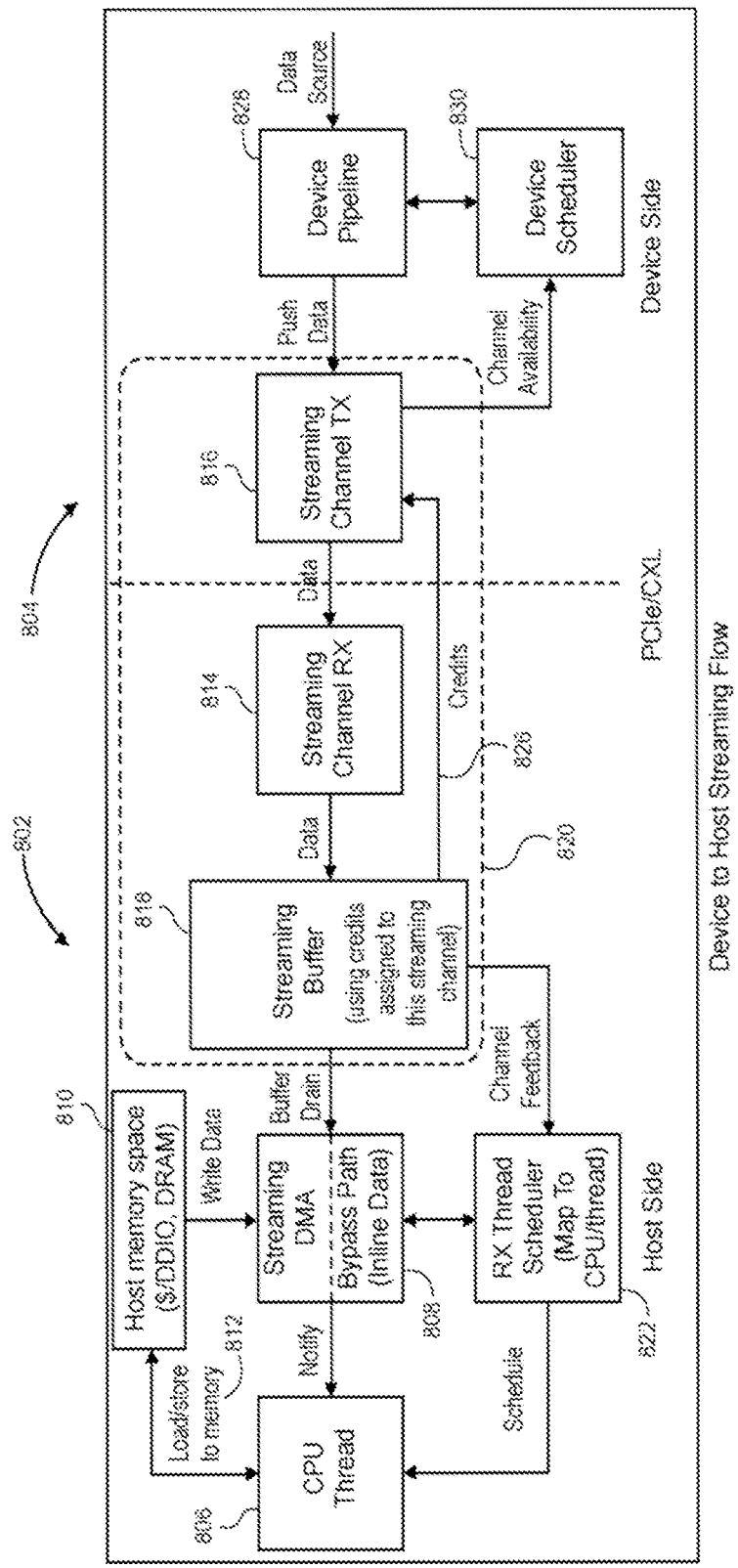
FIG. 6 is a block diagram representation of a device to host streaming flow via a streaming subsystem in accordance with various embodiments.

Referring to FIG. 6, a block diagram representation of a device to host streaming flow via a streaming subsystem 340 in accordance with various embodiments is shown. The D2H components of FIG. 6 are comparable to the H2D block diagram of FIG. 5, but the data flows shown in FIG. 6 are in the opposite direction. Data is sourced on the far right from an I/O device 804 according to the device architecture and enters the device pipeline 828. The optional device scheduler 830 uses channel availability information from the TX streaming channel 816 to schedule data transfers from the device pipeline 828 to the host 802. Data is pushed from the device pipeline 828 through the TX streaming channel 816, over the I/O interface though to the RX streaming channel 814 and into the stream buffer 818 subject to the availability of credits 826.

The stream buffer 818 can be drained through the streaming channels through hints provided by an application running in a CPU thread 806 using the enhanced dequeue ISA described further herein. The architecture will support a variety of models for efficiently moving the data from the stream buffer to the appropriate location which can be CPU register, cache hierarchy or only DRAM. For example, some channels can be configured to bypass the cache hierarchy 808 and place the data directly in the CPU register for the lowest latency. For these channels, the data may not be very large. Software can decide to either process the data and place it in the memory hierarchy or discard it after digesting data, with respect to Bypass Inline Data 808.

Dequeue ISA (Enhanced)

The dequeue instruction is submitted by software to each streaming channel 814. The instruction may permit different data transfer mechanisms. The execution of the dequeue instruction by the CPU thread 706 leads to the operations as shown with respect to FIG. 6. In embodiments, the execution may occur at one time, and then the effects are to cause the movements and coordination that FIG. 6 depicts in subsequent times.

Memory bypassing cache hierarchy: Streaming DMA 808 into host memory space 810 DRAM, and/or non-volatile memory (NVM), for uses which include large data transfers, etc. In embodiments, the streaming data is not consumed by the application immediately. In embodiments, the streaming data may never be consumed, for example for the case for a passive log replication, passive data replication, distributed file transfer, rsync, and related types of usages. Embodiments allow the application to direct the streaming data to be placed in the host memory space 810 DRAM without perturbing the cache hierarchy.

Host Memory 810: Streaming DMA 808 into host memory where the data is consumed by a host based operation, e.g. a software thread, container, etc. The direct data I/O (DDIO) flows of host memory 810 can be used to stream the data into a cache and may overflow into the DRAM as appropriate. In embodiments, additional cache hints may be made to place data into different layers of the cache hierarchy. For example, into LLC in many cases, into memory-side L4 cache in some other cases, or only in some sockets and not into some other sockets, etc. Implementation of embodiments tightly match software policies for placements of threads or integrated accelerators that are consuming the data.

Bypass Memory. A bypass path 808 allows the data for smaller transfers to be in-lined directly into a notification that is delivered into a designated CPU thread 806. This notification may be into a set of named registers, vector registers, or named scratchpad memory, etc., to further reduce latency. The host-side RX scheduler 822 is responsible for mapping the incoming data transfer to a specific CPU/thread 806 and for causing that thread to be scheduled.

Hybrid mode: Some elements of data in the RX streaming channel 814 may be specified for one of the above modes, and the remaining elements may be specified for a different mode. For example, some header data from packets may be filtered from the receive streaming channel 814 and handled as memory bypassing 808, even as all the data is sent to memory. Note that in embodiments, the streaming channel is a logical, not physical part of the stream buffer. The data may flow from the streaming channel to the memory, although physically the data may flow from the stream buffer, or may not even be physically moved in the stream buffer if the channel level decision is to bypass directly to memory.

To achieve the low latency, specifically for latency sensitive streaming flows, cooperation occurs between device scheduler 830 and the receive thread scheduler 822.

However, for bulk transfer flows, the device side 804 and the host side 802 can be lightly/loosely coupled. In lightly/loosely coupled cases, the streaming DMA engine 808 may directly land data transfers into the host memory 810, at high capacity and high bandwidth. This approach allows OS thread scheduling latency and software stack delays to be mitigated. This contrasts with the previously described H2D direction where the (typically) much smaller buffering capacity on the device side implies tighter coupling between host-side 802 and device-side 804 scheduling to avoid exhausting the buffer or causing head of line blocking.

Stream Buffer. The stream buffer 818 is shared by all streaming channels and the number of streaming channels can be very large in some use cases. For example, 1 million streaming channels (per direction) to support 1 million queues for high-scale networking.

However, in embodiments the stream buffer 818 size is moderated for cost reasons. Further, embodiments of the streaming architecture may be based on shallow buffering so that transfer latency is minimized rather than exploded by queueing delay. Thus, in embodiments, the total space outlay for a stream buffer 818 may not be millions of megabytes. For example, it may not be a product of the number of channels and the amount of buffer capacity to be made available per channel. In embodiments, the actual size of the stream buffer may be implementation specific. In each implementation, embodiments may include to size it according to a bandwidth-delay-product (BDP) plus a slack, for example: "=peak bandwidth of the device x round-trip (host-device) latency+slack_capacity" around the push data/credit 826 return loop between two consecutive uses of the same buffer credit 826. In embodiments, slack_capacity provides an additional margin to allow for decoupling between filling and draining of the buffer, or in other words, to allow a producer to push data into a buffer even as it takes some additional time beyond transfer latency for the consumer to drain and release the capacity for reuse. Further, slack also provides for reserving some capacity against dedicated credits for specific, e.g. high priority, low-jitter, streaming channels (to be described later below).

In one non-limiting example for illustration, consider that a device, e.g. a NIC, is 800 Gbps. A credit loop (round-trip) latency is 1us. Then the stream buffer 818 size may be calculated as 800 Gigabits/second×1/(1000,000) seconds=800 kilobits, or 100 KB, and with various other encoding overheads, about 128 KB.

Now consider an example where multiple traffic classes are to be supported, with independent stream buffers 818 per class, to provide for predictable, low latency quality of service. Suppose 8 classes are to be supported. Because the classes are independent and each is given its own separate buffer capacities, we may compute the buffer size=128 KB×8=1 MB. (without slack)

In embodiments, given other degrees of freedom, the above capacity may be reduced. In some usages where data is strictly ordered for delivery, e.g., according to specification, and/or coherency requirements over data, the data may not be split into different traffic classes. Another reason that capacity can be reduced is that an implementation on the host side 802 can choose to provide the stream buffer by carving out a region of the LLC or an L4 (memory-side cache) and hard allocating it, e.g. statically dedicating the use of the carveout, as part of a stream buffer, which reduces the amount of residual capacity to provide in order to satisfy the BDP constraint.

Credit Assignment and Recycling

In an embodiment, the credit 826 size is specified by the architecture. In embodiments, a credit size of 64 bytes may match the host cache line size and may be a reasonable granularity for buffer sharing, credit logic and state management. Embodiments of credit sizing may be based on encoding formats used for credit return and/or implementation studies.

The stream buffer 818 is implemented on the receive side of the streaming channel in the host 802 and the device 804. The stream buffer 818 may be divided into credits 826 and the credits 826 are conveyed to the transmit streaming channel 816 for use. In embodiments, credit assignment and accounting is performed on the device side 804 (TX), and the receive side 802 (RX) is simply responsible for receiving data into the stream buffer 818 and returning credits 826 as space is drained. This approach gives great flexibility on the TX-side 804 credit algorithms and may permit straightforward approaches for dynamic reconfiguration of credit 826 limits without flushing in-flight transfers.

Figure 7A:
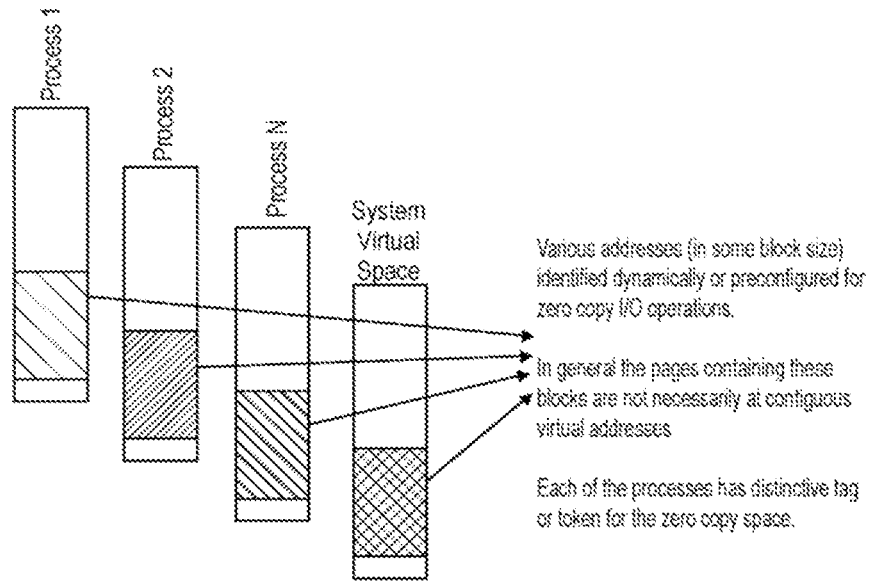
FIGS. 7A-7C are diagrams describing zero copy memory, in accordance with various embodiments.
Figure 7B:
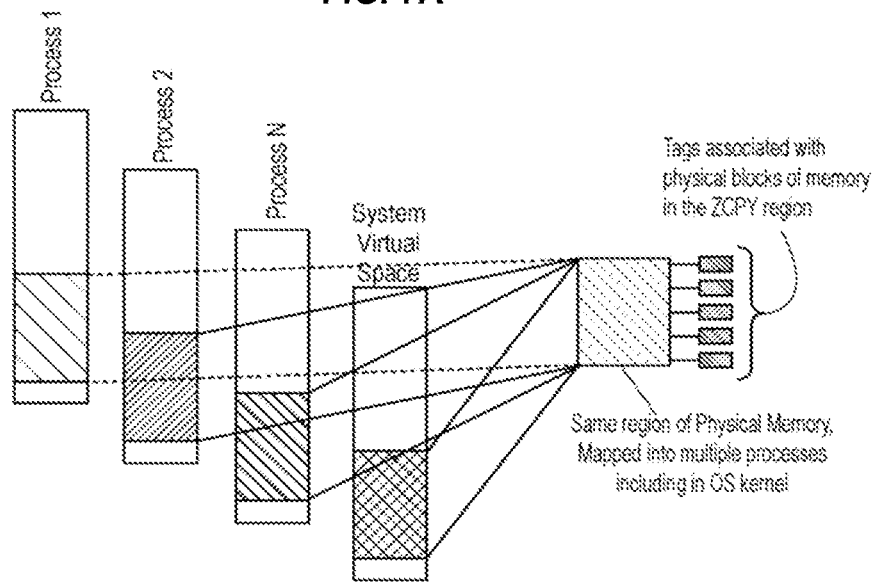
Figure 7C:
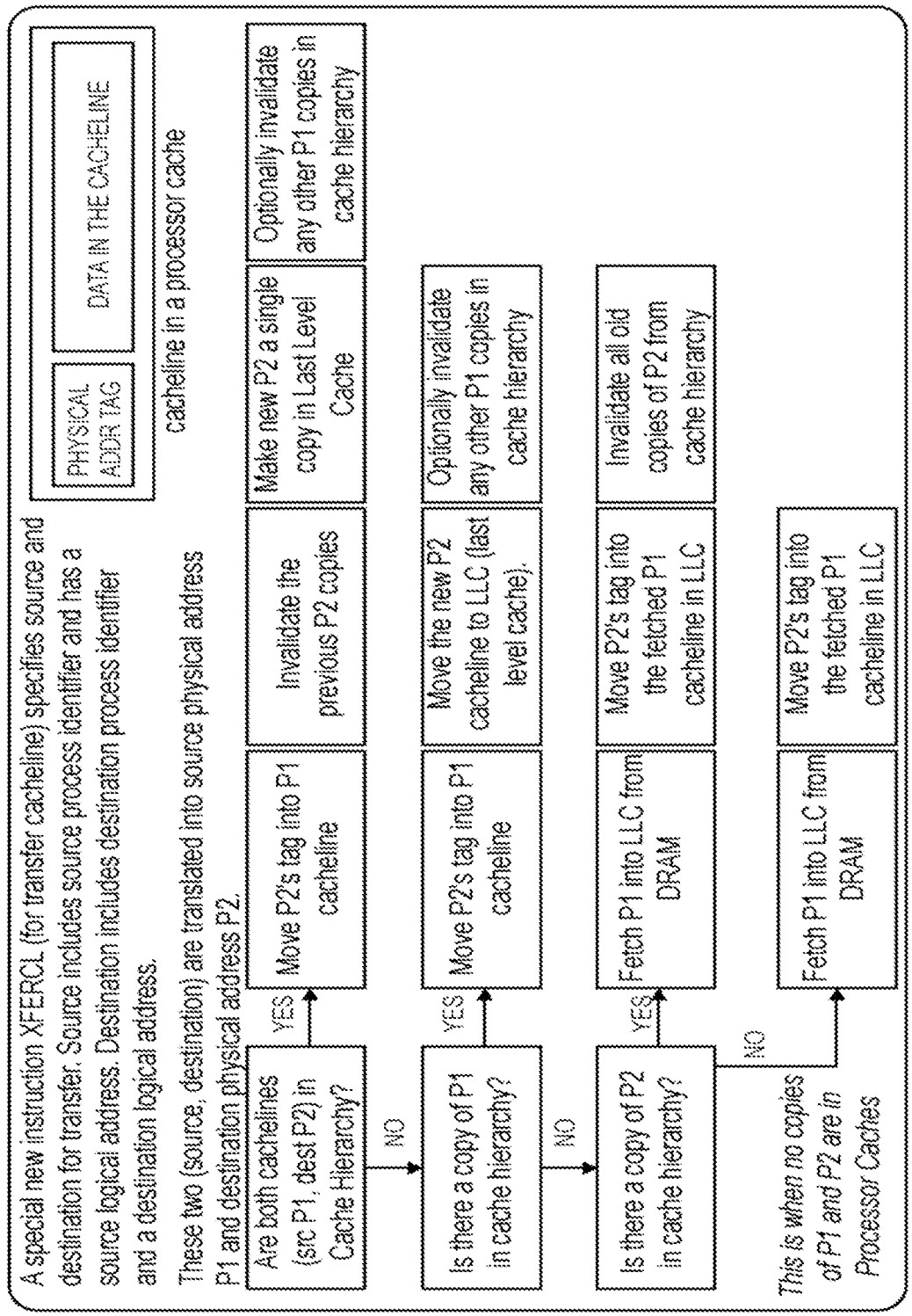

FIG. 7A-7C are diagrams describing zero copy memory, in accordance with various embodiments. Zero copy memory may be referred to as ZeCOM. Embodiments for achieving many classes of producer-to-consumer data transfers without actually performing data copies, or deferring data copies sufficiently that they do not need to be performed, are described below.

Embodiment 1: A Transient (Ephemeral) Region "ZeCOM" for Zero-Copy Memory

A summary of embodiment 1: ZeCOM provides for a push and pull model for communication. ZeCOM memory area is mapped into each entity's (sender entities, receiver entities) physical address space. For each pair of entities, a second "tag space" contains a space for tags, one tag per entity per cacheline in ZeCOM. This tag is called OTAG, for "ownership tag." Initially, the tag may be owned by a root of a hypervisor or a system owner. It may then transfer the tag to an owner, e.g. a VM, that receives data entered into corresponding cacheline in the ZeCOM.

Push model: When a current owner, A, wants to transfer the data to a next owner B, an instruction CLSND (cache line send) is used to change the correspond OTAG so that the OTAG shows B as the owner of the cacheline. NOTE: each identity, such as A, B, etc. is associated with an ITAG, and the OTAG is changed from the ITAG of the sender to that of the receiver. The CLSND instruction first verifies for each cacheline being pushed, that the OTAG of the cache line matches the ITAG of the sending or pushing party.

On a tag match, the OTAG field of the cache line is updated to the ITAG of the receiving party. This should be the frequent case. After that point, the pushing party no longer owns the cache line according to the OTAG. NOTE: if the tags do not match, an error is signaled to pushing party, which may result in any corrective action such as alerting, notifying to some handler, sender being stopped and a recovery process initiated, etc., because it is generally an indication of a logic error.

Note that data does not move since the physical address in ZeCOM where the data was before the push is the same as the physical address after the push. Thus there is no data copy. The cache hierarchy and carries the OTAG field for each cache line. Whether the cache hierarchy does so by partitioning a portion of the cache for supporting ZeCOM or whether it supports the OTAG for all lines in the cache is an implementation choice. (For non ZeCOM cache lines, the OTAG would have no meaning and will be ignored).

Pull model: For the pull model, two instructions are used-CLRCV (Cache Line Receive) and CLMTOKEN (Cache Line Make Token). A current owner may perform a CLMKTOKEN to authorize the CLRCV operation on a cache line that it wants to permit to be received by any subsequent owner (a future receiver party). A pulling party performs the CLRCV operation to change to OTAG to its own (i.e., the pulling party's) ITAG. The CLMKTOKEN instruction verifies that a current owner that performs the CLMKTOKEN has the current ownership before it authorizes the CLRCV. After a successful CLRCV, the cacheline may no longer be permitted a second CLRCV until there is a CLMKTOKEN.

In addition to the above basic instructions (CLSND, CLRCV, and CLMKTOKEN), a number of additional instructions are also defined to create a framework for producer-consumer communication and synchronization—these are CLPRODUCE, CLTEST, and CLTICKLE. CLPRODUCE permits the creation or initialization of the ITAGs and storage for ITAGs for each user of ZeCOM, CLTEST may be used to check if the current OTAG matches or does not match a given ITAG—for writing defensive code, for example, and CLTICKLE may be used to touch a cacheline in ZeCOM without actually referencing its data—for example, to cause it to be prefetched, etc.)

Bulk operations (such as REP prefixed operations) may be provided to push or pull a range of addresses in ZeCOM without performing these operations one instruction per cacheline.

Embodiment 2: Virtualized Cache Line Transfer in Cache Hierarchy (Only)

An alternative method of avoiding data copies is to reduce data movement between caches (L1, L2, LLC) and the CPU registers while allowing them to be performed normally in the memory subsystem. Since many producer consumer transfers are chains from production up to eventual consumption, this alternative avoids copies in cache hierarchy while delegating bulk copies from source physical addresses to destination physical addresses to a memory-to-memory DMA engine. Bulk copies may themselves be virtualized by transferring physical pages from the donor to the receiver.

To avoid data copies in the cache hierarchy, this alternative introduces a sender side instruction, called XFERCL (for Transfer Cache Line). The XFERCL instruction checks if a cache line is in the processor cache hierarchy, and if present: demotes it to LLC, and while demoting, switches its physical address tag from that of the source to that of the destination, without changing its data. If the source line previously existed in the LLC (before demotion), then XFERCL emulates a MOVGET-MOVPUT combination so that data is transferred from source to destination in LLC, and the source line becomes marked as "LRU". Under one alternative, CLXFER operation performs a local data copy in L1 or L2 without bringing data into and out of the CPU core.

Embodiment 3

FIG. 7A-7B show another embodiment 3. A special region of physical memory is configured for zero copy operation. This may be referred to as a ZCPY region. It is of some predetermined size depending on processor implementation and configuration. It is divided into a set of blocks. Each block is associated with a tag.

Processes contain various virtual address that map to this region for the sake of zero copy transfers of memory blocks. These addresses are already mapped at start time (when processes are created). They do not have to be in contiguous virtual pages, but it is shown that way in FIG. 7A for visual simplicity.

Every process shares this ZCPY region. The region is divided into blocks as stated above and each block is associated with a tag. The tags are in a region of memory that is not directly accessed by normal program instructions. Privileged instructions can set up tags in the region of memory as needed when called by a system driver process.

Each process is associated with a distinctive token. System process (e.g. a host or a guest operating system) may also has a distinctive token.

To move data in a given block X in the ZCPY region from one process P 1 which owns X to a second process P 2, instructions will be implemented that opaque to normal program code, will do this in hardware: Check that X's tag has P 1's token (i.e., P 1 owns X); If not, throw an error (i.e., attempt to transfer data that is not owned by the "sender"); With P 1 owning X at the start of the instruction, the hardware moves P2's token into the tag associated with X, which makes P 2 the owner of X.

Above is the "push" flow—i.e., the donor of X giving or pushing X to the receiver.

Alternatively there can be a pull flow, within this embodiment. In the pull flow, the receiver P 2 needs to be able to pull a block in ZCPY memory into itself from whoever is the current owner. This is done by P 1 having first dropped its ownership and written a token into X's tag that specifies a group ownership. P 2 needs to be part of that group when it pulls.

Claims to include instructions to set up the zero copy region as above, and instructions to pull, push, or check for current ownership.

Embodiment 4

In this embodiment, the goal is not to achieve zero-copies in all cases, but only to reduce the amount of data movements in processor caches, where frequently accessed data goes anyway. By not reducing amount of data movements beyond processor caches, not much is lost because only a small fraction of data movements that happen in caches actually translate into memory traffic (this happens when data eventually falls out of processor caches).

Unlike embodiment 3, this embodiment does not require a tag/token arrangement or a special ZCPY region. It is therefore simpler and less cumbersome, and it requires less setup work, therefore.

FIG. 7C shows a cache line in a processor cache. That cache line has data. It also has a tag that identifies which physical address the cache line is from. To reduce data movements in the cache, consider that data are either being copied or moved from a physical address P 1 to another physical address P 2. The source and destination processes can be the same or different, that is a matter of how memory protections are set up by ordinary page table mechanisms in the operating system. In this case, there is also no difference between push and pull flows, since there is no concern with processes that are the source and destination. Whichever process is performing the movement supplies a "from" and "to" logical descriptors, both "from" and "to" contain a process id and a virtual address. In the common case, these transfers will be in the same process from one area that is private to the process, to another area that the process shares a common mapping to from other processes.

Regardless of whether transfer is within same or between different processes, this embodiment goes as follows.

An instruction called XFERCL is implemented. This instruction translates the "from" and "to" descriptors so that it they become physical addresses P 1 ("from") and P 2 ("to").

The flow chart shows how, instead of moving data, only the physical addresses are switched from P 1's physical address to P 2's physical address. When the source is not in processor cache hierarchy, then the alternative embodiment brings the data from DRAM into the LLC (last level cache) and then performs the tag switch.

Figure 8:
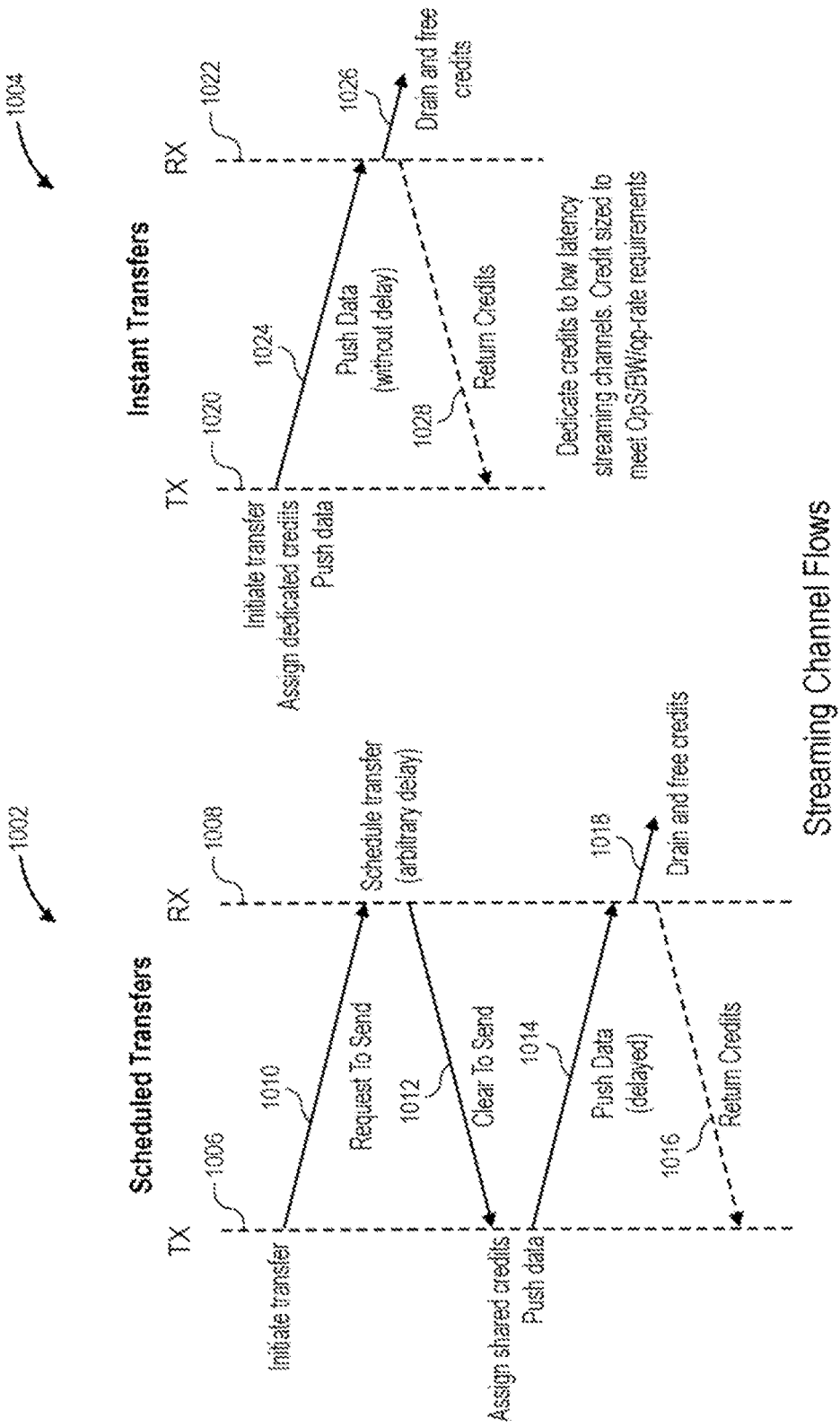
FIG. 8 is a diagram that shows transfers within a streaming channel flow via a streaming subsystem in accordance with various embodiments.

FIG. 8 is a diagram that shows transfers within a streaming channel flow, in accordance with various embodiments. Embodiments may include scheduled transfers 1002 and instant transfers 1004. The same flows can be supported in both H2D and D2H directions to give symmetry and IP reuse between transmitters and receivers. In embodiments, the streaming channel flow is similar to a "push data" transaction from the streaming channel TX 1006, 1020 to the streaming channel RX 1008 1022. However, credits, such as credits 726 of FIG. 5 or credits 826 of FIG. 6, are assigned before the data is pushed to avoid buffer exhaustion. Credits are managed locally on the TX side 1006, 1020 and are returned by RX 1008, 1022 in a pipelined, latency-hiding manner without active software involvement.

Embodiments of data flow transmission include scheduled transfers 1002 and instant transfers 1004. Both kinds of transfers consume stream buffer resources until the device (CPU or I/O) drains the buffer and returns their credits. In embodiments, the device is to drain the stream buffer expeditiously for both kinds of transfers 1002, 1004 to avoid performance impact. The instant transfer 1004 mechanism uses dedicated credits to prevent head of line blocking across streaming channels in scenarios where the device cannot drain the buffer expeditiously. Each streaming channel may be based on a priori service level agreement (SLA) enabled by software, and can be configured to be either scheduled, instant or both depending upon the credits available.

Scheduled Transfers

In embodiments, a scheduled transfer 1002 may allow the RX 1008 side to determine when the transfer is to occur. An example where such transfer may exist is when the I/O Device has specific scheduling algorithms supported in the device that are not present or supported by the CPU. An example flow is described below.

At flow 1010, the TX 1006 initiates the transfer by sending a Request To Send (RTS). This is similar in concept to a doorbell but may contain additional metadata fields to describe the nature of the transfer such as its size. RX 1008 receives the RTS and performs scheduling for the operation which may result in an arbitrary delay depending on the device-side scheduling algorithm.

At flow 1012, when ready, the RX 1008 sends the Clear To Send (CTS). This contains an ID to refer to the original RTS, and optionally metadata fields. TX 1006 receives the CTS. Credits are assigned from free shared credit pool, or there is a further delay if additional credits are required.

At flow 1014, after credits are assigned, the data is pushed over the I/O bus to the RX 1008. In the best case, the transfer experiences only a round-trip delay, but potentially there can be arbitrary scheduling delay on top. RX receives the pushed data and places it into the stream buffer.

At flow 1018, as the data is drained out of the stream buffer into the device pipeline the credits can be returned.

At flow 1016, TX 1006 receives credits and returns them to the free shared credit pool. Note that scheduling (the RX 1008 side) is decoupled from credit assignment (the TX 1006 side).

Instant Transfers

In embodiments, an instant transfer 1004 allows the TX side 1020 to initiate the transfer immediately. These instant transfers are essentially "pre-scheduled" in the sense that the RX 1022 gives implied pre-approval ahead of time for the TX 1020 to initiate the transfer. In embodiments, credits may be dedicated to the streaming channel to support instant transfers. In embodiments, this may be typically achieved when the streaming channel is created, ahead of any data transfers, but potentially can be reconfigured dynamically. Because credits are a limited resource, in embodiments, the expectation is that credits are only dedicated to latency-sensitive streaming channels. Typically, relatively few credits may be required to achieve fall-through latency optimization. The number of dedicated credits can be sized to meet QoS, bandwidth (BW), and/or operation rate requirements on these channels but subject to keeping a sufficient pool of shared credits for scheduled transfers.

Note that, in embodiments, dedicated credits may be more important in the H2D direction, and may allow the device to size its stream buffer appropriately for the device architecture and performance characteristics. In embodiments, the host-side stream buffer may not need to support dedicated credits and may be typically sized only by bandwidth-delay-product.

In embodiments, a streaming channel that is configured to use the instant transfer 1004 technique will rely on the scheduling features that are implemented on the RX 1022 side. This technique may provide a lower latency path compared to the scheduled transfer 1002 technique.

In embodiments, instant transfers 1004 may only use dedicated credits. If a transfer requires more credits than the total number of dedicated credits configured to a streaming channel, then a scheduled transfer 1002 may be used. Otherwise, an instant transfer 1004 or a scheduled transfer 1002 may be used at the discretion of the implementation, which may include a software hint to influence the choice. Thus, in embodiments, the implementation is allowed to choose between waiting for dedicated credits to be returned versus using a scheduled transfer 1002. In embodiments, dedicated credits are assigned to the transfer. There may be a delay while waiting for previously used dedicated credits to be returned. After credits are assigned, the data is pushed to the RX 1008. In the best case, e.g. for fall-through latency, there is no delay at all on the instant transfer and this would represent the lowest latency that can be achieved for a data transfer. An example flow is given below.

At flow 1024, RX 1022 receives the pushed data and places it into the stream buffer. At flow 1026, as the data is drained out of the stream buffer into the device pipeline, the credits can be returned. At flow 1028, TX 1020 receives credits and returns them to the free dedicated credit pool.

Coordinated Scheduling

Returning now to FIG. 4, embodiments of the streaming I/O architecture described herein enables I/O data to be placed close to compute at cache latencies. This is a distinction over legacy systems, and that, in embodiments, several techniques may be used to leverage such capabilities. One example includes coordinated scheduling between I/O 630 and compute 620, e.g. between the streaming channel 654 and the application threads of the CPU 620.

FIG. 4 illustrates the concept of coordinated scheduling between the hardware (H/W) events and software (S/W) applications 662. As shown, the H/W scheduler 672 in the streaming channel 654 architecture provides a tighter feedback loop enabling granular and smarter software decisions. In embodiments, the S/W scheduler 674 schedules application threads based on feedback from the H/W scheduler 672. The H/W scheduler 672 has information on transmit buffer occupancy and receive buffer fill levels in the streaming channel 654.

So, when an application thread is scheduled, the corresponding streaming channel 654 is ready to send or ready with receive data. In addition, the network scheduler 670 in the I/O device 630 can send feedback to the H/W scheduler 672 such as queue levels and timing information that can be used for scheduling decisions.

Optionally, the H/W scheduler 672 is given the ability to inject a library level switch event into a CPU thread, causing it to perform a pre-scripted transfer of control to a pre-specified code address in user space, with a small number of GPRs saved on a standby stack, to handle the event. Typically, the switched-to code address serves as the starting point of a short, non-preemptable, run-to-completion sequence of instructions for performing an application posted function, and then resuming the previously interrupted thread. In embodiments, the H/W scheduler 672 acts, in effect, as a remote switcher to a run-to-completion handler. Applications that are written to handle communication events as callbacks that run immediately and perform a first level disposition of the data coming at them through the channel can thus perform their own internal task switching without costly interrupts, user-kernel-user transitions, or busy-polling.

Mapping to I/O Transactions

It is envisaged that all SDDS transactions, including data transfers and credit returns, will map to memory write transactions on the I/O bus. In embodiments, various metadata fields will be encoded in the memory write payload, along with the actual data to be transferred. The TX and RX logic takes care of the bundling/unbundling of metadata with data. The memory write addresses used in these transfers are in the address space of the strong customer authentication (SCA) mechanism, and do not refer to host memory addresses, which are encoded in the metadata.

Turning now to FIG. 2, diagram 400 is a ladder diagram of an embodiment of a streaming I/O interface that illustrates a two-step process to push the data from the CPU (driver) 407 to the I/O device 408 whenever the data is ready for transmission. In embodiments, data is pushed to the I/O 408 device using memory semantics whenever data is available, and the device 408 completes the transaction. There is flow control mechanism, as discussed above, to indicate if the device 408 is ready to accept the data for transmission.

Figure 9:
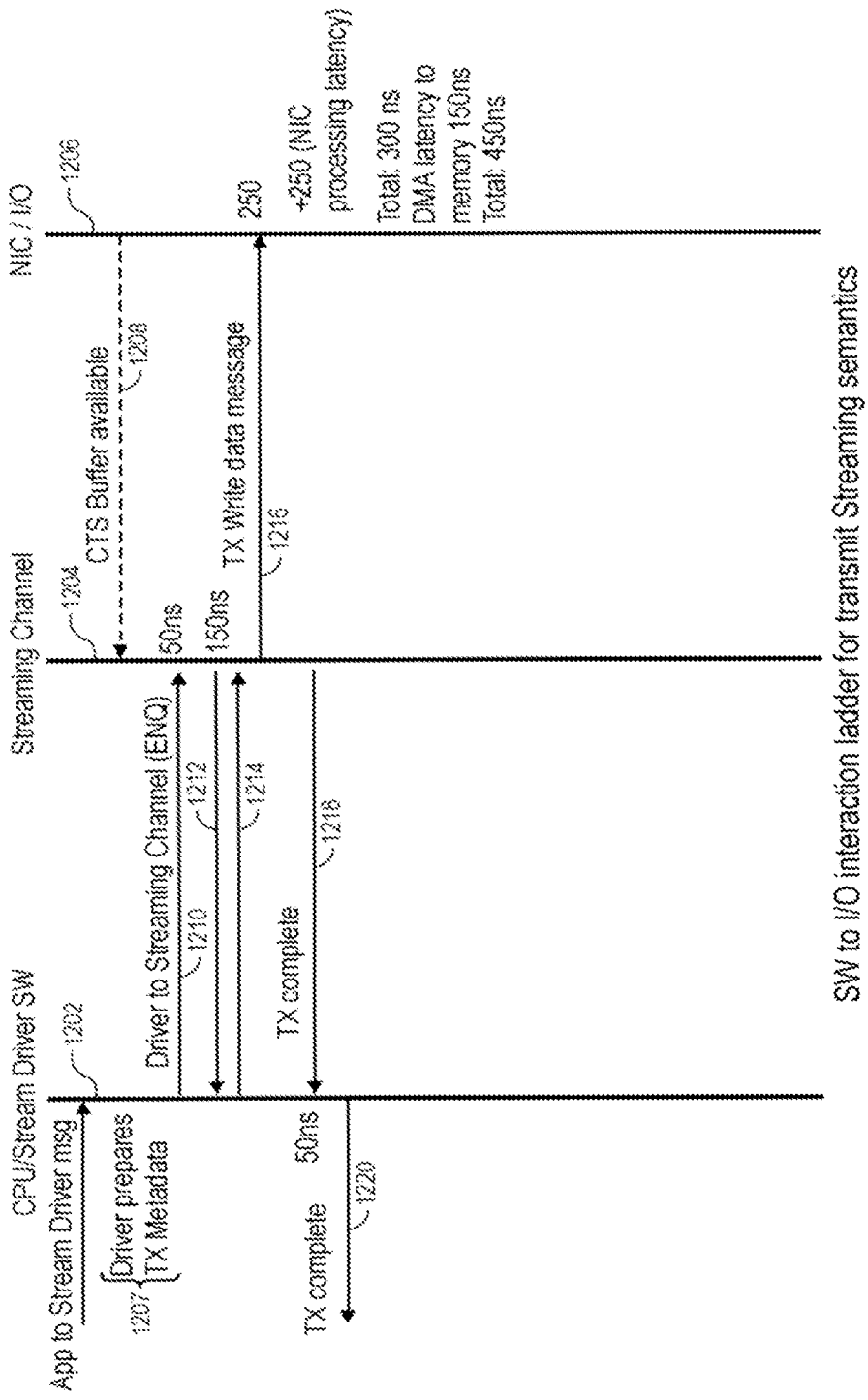
FIG. 9 is a diagram that shows application software to I/O interaction for transmit streaming I/O semantics, in accordance with various embodiments.

FIG. 9 is a diagram that shows application software to I/O interaction for transmit streaming I/O semantics, in accordance with various embodiments. FIG. 9 illustrates improved latency in an embodiment of streaming I/O transmission using the two-step process shown in FIG. 2, with memory semantics that is estimated having a total time of 300 ns, about 3-3.5× scale up compared to typical legacy I/O semantics. The streaming I/O architecture embodiment in FIG. 9 assumes the use of enqueue instruction for transmit from CPU to the streaming channel as described above.

Figure 10:
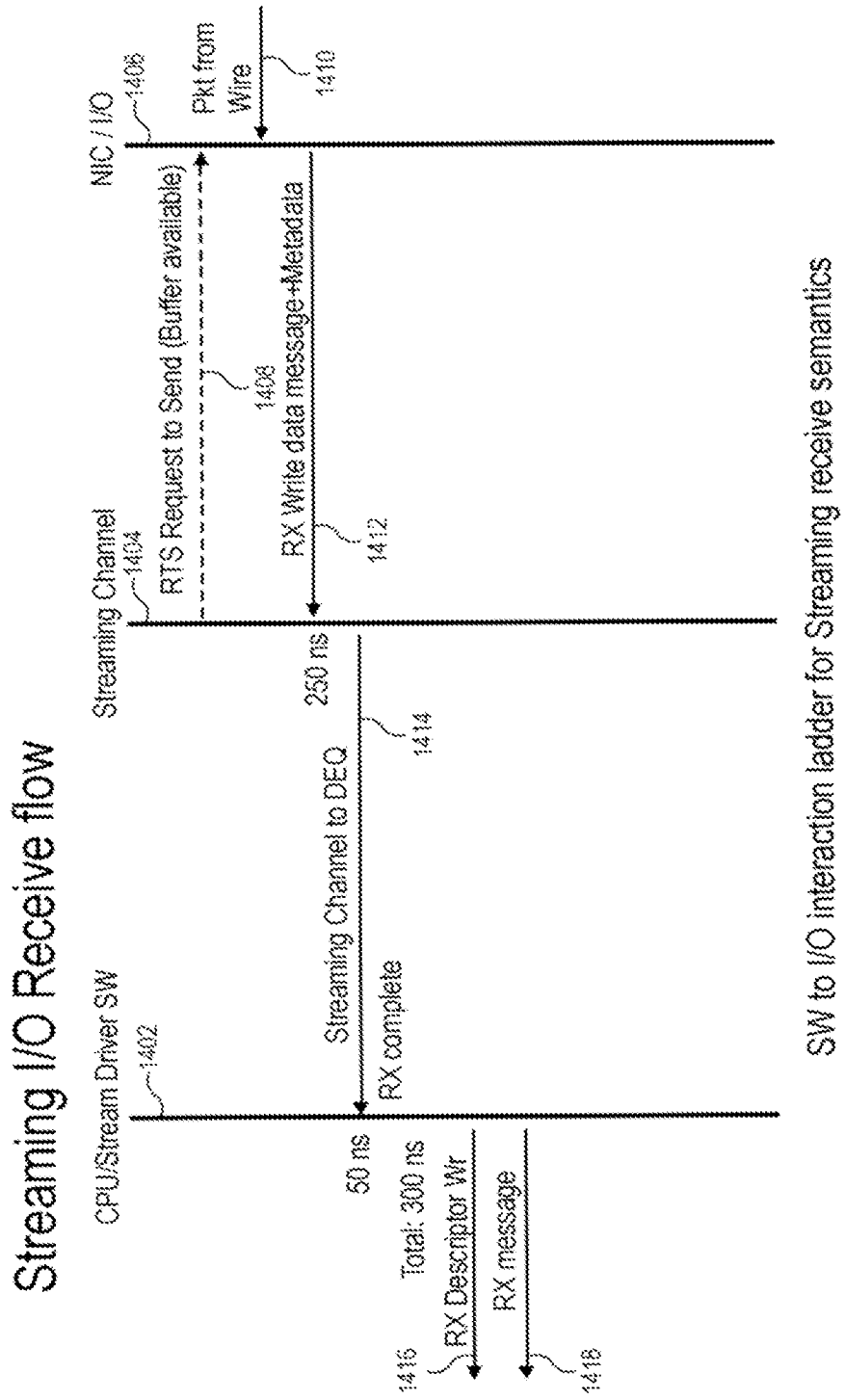
FIG. 10 is a diagram that shows application software to I/O interaction for receive streaming I/O semantics, in accordance with various embodiments.

FIG. 10 is a diagram that shows application software to I/O interaction for receive streaming I/O semantics, in accordance with various embodiments. FIG. 10 illustrates an embodiment of the streaming semantics for the receive transactions with latency estimates. The streaming architecture assumes the use of dequeue instruction for receiving data from the streaming channel to the CPU. The total time shown is 300 ns. The use of streaming semantics for receive is estimated to provide about 2× scaling compared to the I/O semantics model.

FIG. 11A and FIG. 11B are examples of commands, input parameters, and output parameters to support a streaming channel architecture, in accordance with various embodiments. FIGS. 11A and 11B show embodiments of library level application programmer interfaces (APIs) around low-level instructions, or virtual instructions. These embodiments are examples of interfaces for managing and interacting with a steaming channel. These examples illustrate some primary operations involving a streaming channel.

Figure 12:
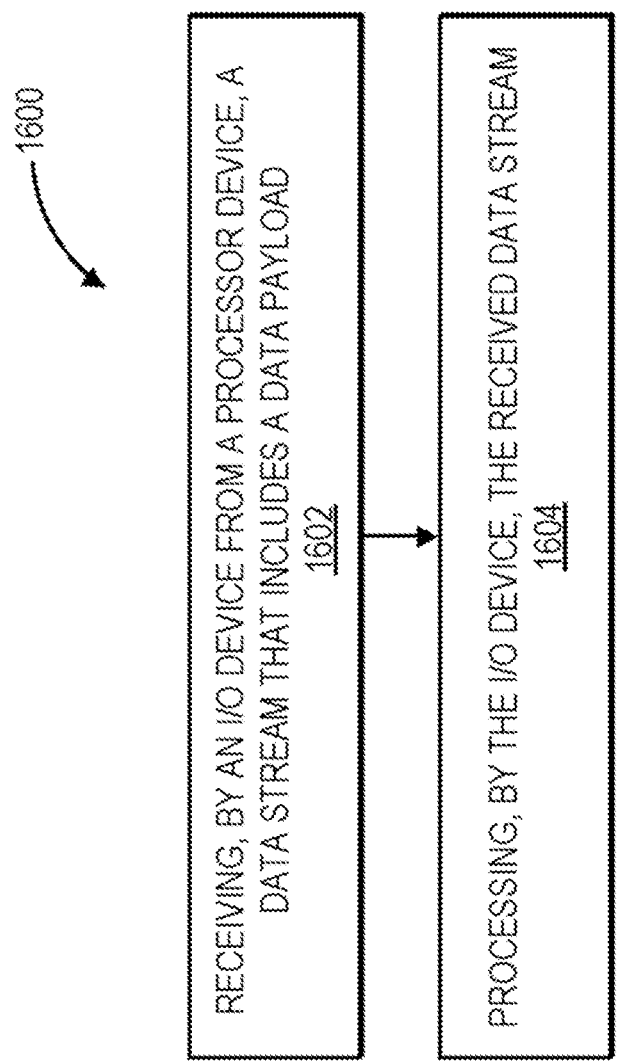
FIG. 12 shows an example process to implement streaming channel architecture, in accordance with various embodiments.

FIG. 12 shows an example process to implement streaming channel architecture, in accordance with various embodiments. Process 1600 may be implemented by one or more of the apparatus, techniques, designs, architectures, processes, or other disclosures herein. In embodiments, process 1600 may be implemented by streaming I/O receive module 1718 and/or streaming I/O transmit module 1719 of FIG. 13.

At block 1602, the process may include receiving, by an I/O device from a processor device, a data stream that includes a data payload.

At block 1604, the process may further include processing, by the I/O device, the received data stream.

Figure 13:
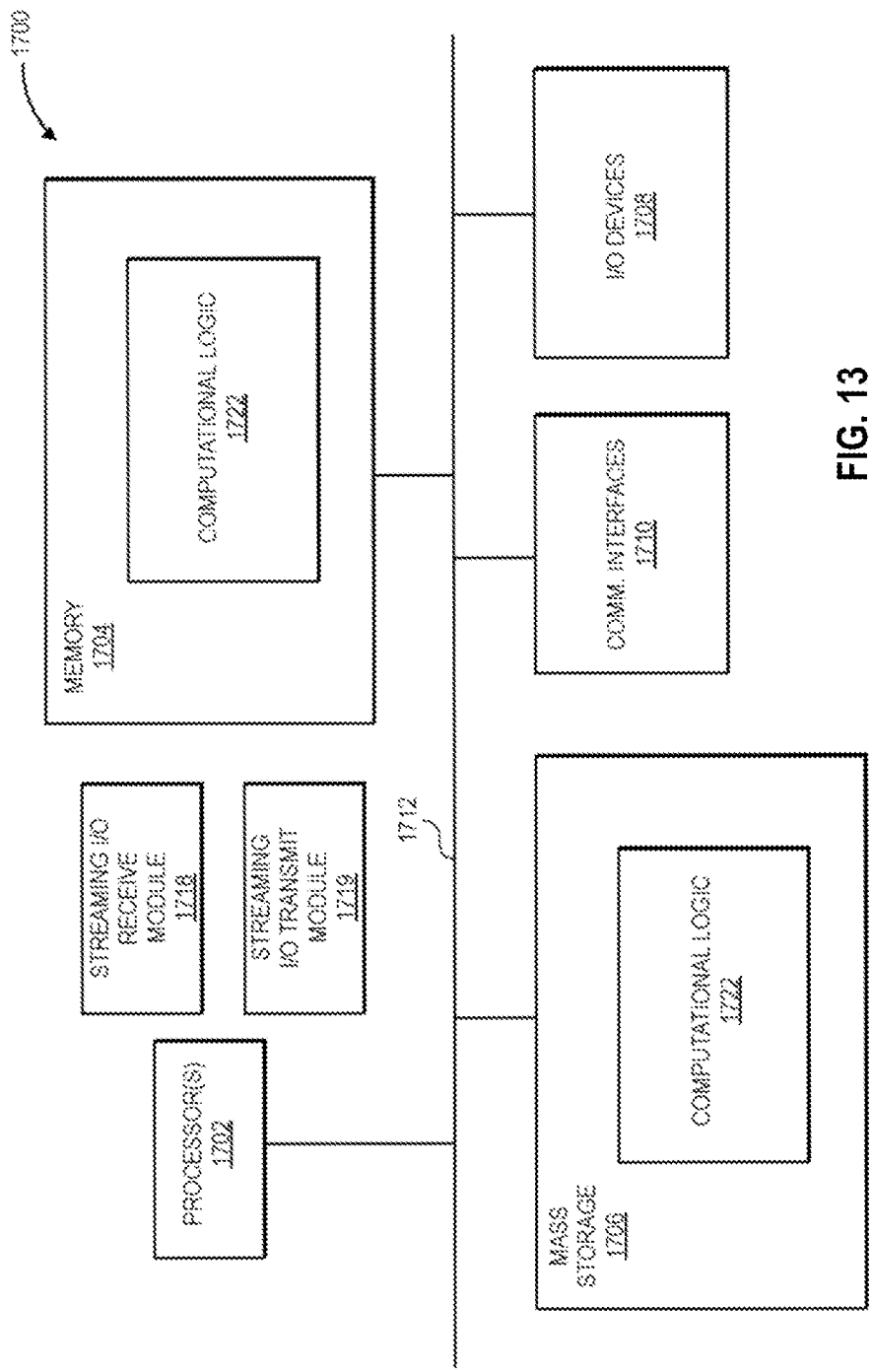
FIG. 13 illustrates an example computing device suitable for use to implement components and techniques described herein, in particular with respect to FIGS. 1-12, in accordance with various embodiments.

FIG. 13 illustrates an example computing device 1700 suitable for use to implement components and techniques described herein, in accordance with various embodiments. As shown, computing device 1700 may include one or more processors or processor cores 1702 and one or more devices, e.g., system memory 1704, mass storage 1706, communication interface 1710 and I/O devices 1708. Processor 1702 and at least one of device 1704-1710 are incorporated with the streaming I/O technology of the present disclosure. In embodiments, the streaming I/O technology may be implementing as streaming I/O receive module 1718 and streaming I/O transmit module 1719. In embodiments, modules 1718 and 1719 may be implemented as firmware in processors 1702 and the other devices 1704-1710. For the purpose of this application, including the claims, the terms "processor" and "processor cores" may be considered synonymous, unless the context clearly requires otherwise. The processor 1702 may include any type of processors, a microprocessor, and the like. The processor 1702 may be implemented as an integrated circuit having multi-cores, e.g., a multi-core microprocessor.

The computing device 1700 may include mass storage devices 1706 (such as diskette, hard drive, volatile memory (e.g., dynamic random-access memory (DRAM), compact disc read-only memory (CD-ROM), digital versatile disk (DVD), and so forth). In general, system memory 1704 and/or mass storage devices 1706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1700 may further include I/O devices 1708 (such as a display (e.g., a touchscreen display)), keyboard, cursor control, remote control, gaming controller, image capture device, a camera, one or more sensors, and so forth) and communication interfaces 1710 (such as network interface cards, serial buses, modems, infrared receivers, radio receivers (e.g., Bluetooth), and so forth).

The communication interfaces 1710 may include communication chips (not shown) that may be configured to operate the device 1700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. In an embodiment, the communication interface 1710 includes different types of wired protocols. Examples of communication devices with wired protocols include, but are not limited to, Ethernet controllers, NICs with Ethernet protocols, storage controllers that use storage protocols (e.g. FCOE, RDMA, NVMe over fabrics or NVMe over TCP), high performance computing adapters that use HPC protocols (e.g. RDMA, RoCE, iWARP).

The above-described computing device 1700 elements may be coupled to each other via system bus 1712, which may represent one or more buses, and which may include, for example, PCIe buses. In other words, all or selected ones of processors 1702, memory 1704, mass storage 1706, communication interfaces 1710 and I/O devices 1708 may be PCIe devices or other serial bus-based devices. In particular, they may be PCIe devices incorporated with the teachings of the present disclosure to enable detection of silent data corruption. In the case of multiple buses, they may be bridged by one or more bus bridges (not shown). Each of these elements may perform its conventional functions known in the art. In particular, system memory 1704 and mass storage devices 1706 may be employed to store a working copy and a permanent copy of the programming instructions for the operation of various components of computing device 1700, including but not limited to an operating system of computing device 1700, one or more applications, and/or system software/firmware collectively referred to as computing logic 1722. The various elements may be implemented by assembler instructions supported by processor(s) 1702 or high-level languages that may be compiled into such instructions.

The permanent copy of the programming instructions may be placed into mass storage devices 1706 in the factory, or in the field through, for example, a distribution medium (not shown), such as a compact disc (CD), or through communication interface 1710 (from a distribution server (not shown)). That is, one or more distribution media having an implementation of the agent program may be employed to distribute the agent and to program various computing devices.

The number, capability, and/or capacity of the elements 1702, 1704, 1706, 1708, 1710, and 1712 may vary, depending on whether computing device 1700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 1702 may be packaged together with computational logic 1722 configured to practice aspects of embodiments described herein to form a System in Package (SiP) or a System on Chip (SoC).

In various implementations, the computing device 1700 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 1700 may be any other electronic device that processes data.

FIG. 14 depicts a computer-readable storage medium that may be used in conjunction with the computing device 1700, in accordance with various embodiments. Diagram 1800 illustrates an example non-transitory computer-readable storage media 1802 having instructions configured to practice all or selected ones of the operations associated with the processes described above. As illustrated, non-transitory computer-readable storage medium 1802 may include a number of programming instructions 1804 (e.g., including streaming I/O receive module 1718 and streaming I/O transmit module 1719). Programming instructions 1804 may be configured to enable a device, e.g., computing device 1700, in response to execution of the programming instructions, to perform one or more operations of the processes described herein. In alternate embodiments, programming instructions 1804 may be disposed on multiple non-transitory computer-readable storage media 1802 instead. In still other embodiments, programming instructions 1804 may be encoded in transitory computer-readable signals.

Figure 15:
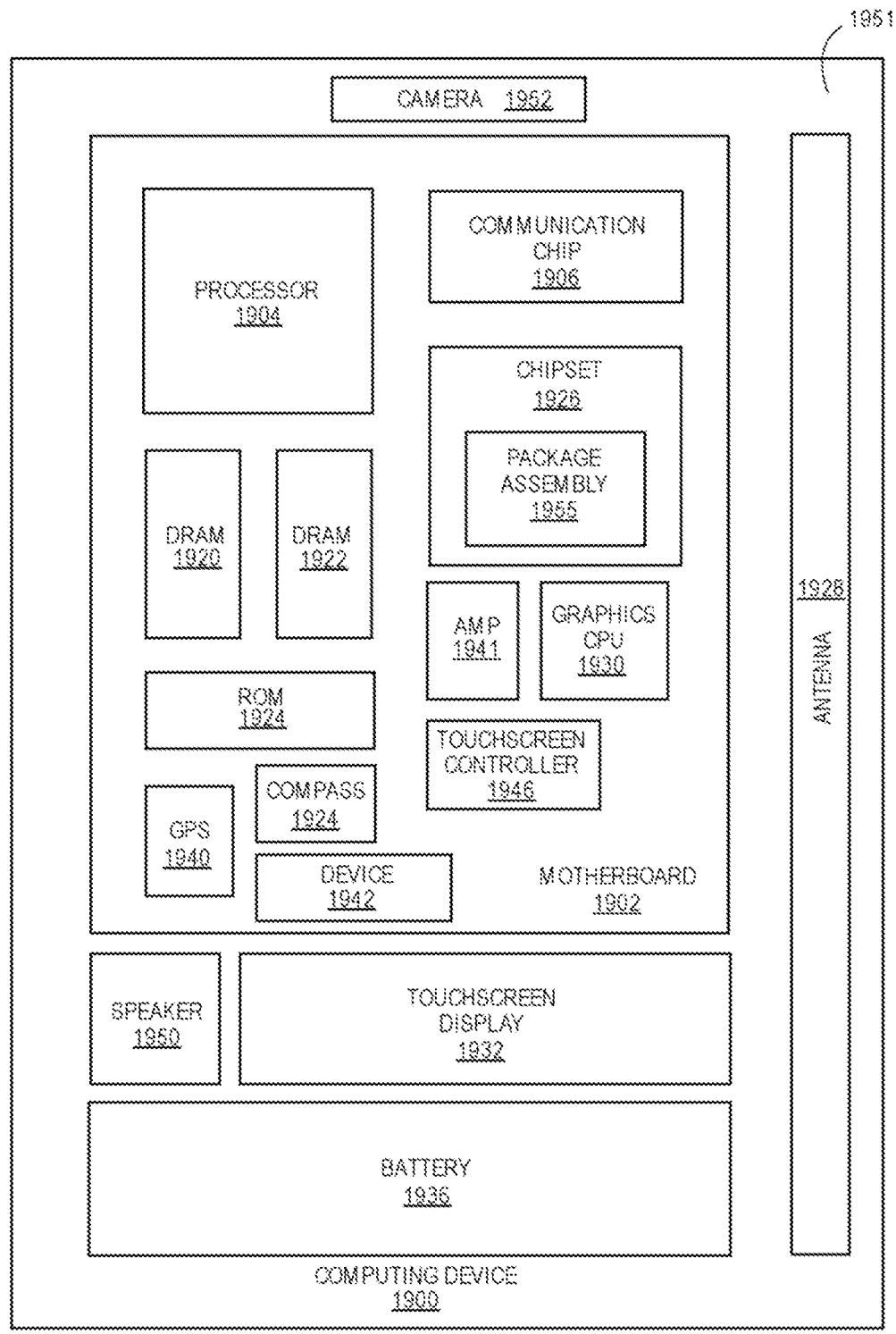
FIG. 15 schematically illustrates a computing device which may include various embodiments as described herein.

FIG. 15 schematically illustrates a computing device 1900 which may include various embodiments as described herein. Embodiments of the present disclosure may be implemented into a system using any suitable hardware and/or software to configure as desired. FIG. 15 schematically illustrates a computing device 1900 in accordance with one embodiment. The computing device 1900 may house a board such as motherboard 1902 (i.e., housing 1951). The motherboard 1902 may include a number of components, including but not limited to a processor 1904 and at least one communication chip 1906. The processor 1904 may be physically and electrically coupled to the motherboard 1902, and incorporated with the streaming I/O technology of the present disclosure. In some implementations, the at least one communication chip 1906 may also be physically and electrically coupled to the motherboard 1902. In some implementations, chips 1900 and 1906 may be optically coupled. In some embodiments, communication chip 1906 is incorporated with the teachings of the present disclosure. That is, it includes one or more embodiments of streaming I/O architecture. In further implementations, the communication chip 1906 may be part of the processor 1904. In other embodiments, one or more of the other enumerated elements may be incorporated with the teachings of the presented disclosure.

Depending on its applications, computing device 1900 may include other components that may or may not be physically and electrically coupled to the motherboard 1902. These other components may include, but are not limited to, volatile memory (e.g., DRAM) 1920, non-volatile memory (e.g., ROM) 1924, flash memory 1922, a graphics processor 1930, a digital signal processor (not shown), a crypto processor (not shown), a chipset 1926, an antenna 1928, a display (not shown), a touchscreen display 1932, a touchscreen controller 1946, a battery 1936, an audio codec (not shown), a video codec (not shown), a power amplifier 1941, a global positioning system (GPS) device 1940, a compass 1942, an accelerometer (not shown), a gyroscope (not shown), a speaker 1950, a camera 1952, and a mass storage device (such as hard disk drive, compact disk (CD), digital versatile disk (DVD), and so forth) (not shown). Further components, not shown in FIG. 15, may include a microphone, a filter, an oscillator, a pressure sensor, or an RFID chip. In embodiments, one or more of the package assembly components 1955 may include embodiments of streaming I/O architecture, as discussed herein.

The communication chip 1906 may enable wireless communications for the transfer of data to and from the computing device 1900. In some implementations, the communication chip 1906 may enable wired communications. Examples of wired protocols include, but are not limited to, IEEE 802.3 Ethernet, Fibre Channel, Infiniband, FCOE and RoCE. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 1906 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 1906 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1906 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN).

The communication chip 1906 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 1906 may operate in accordance with other wireless protocols in other embodiments. In embodiments, the communication chip 1906 may include one or more embodiments of streaming I/O architecture, as discussed herein.

The computing device 1900 may include a plurality of communication chips 1906. For instance, a first communication chip 1906 may be dedicated to shorter range wireless communications such as Wi-Fi and Bluetooth and a second communication chip 1906 may be dedicated to longer range wireless communications such as GPS, EDGE, GPRS, CDMA, WiMAX, LTE, Ev-DO, and others.

The processor 1904 of the computing device 1900 may include a die in a package assembly such as, for example, one or more embodiments of streaming I/O architecture, as described herein. The term "processor" may refer to any device or portion of a device that processes electronic data from registers and/or memory to transform that electronic data into other electronic data that may be stored in registers and/or memory.

In various implementations, the computing device 1900 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1900 may be any other electronic device that processes data, for example, an all-in-one device such as an all-in-one fax or printing device.

Figure 16:
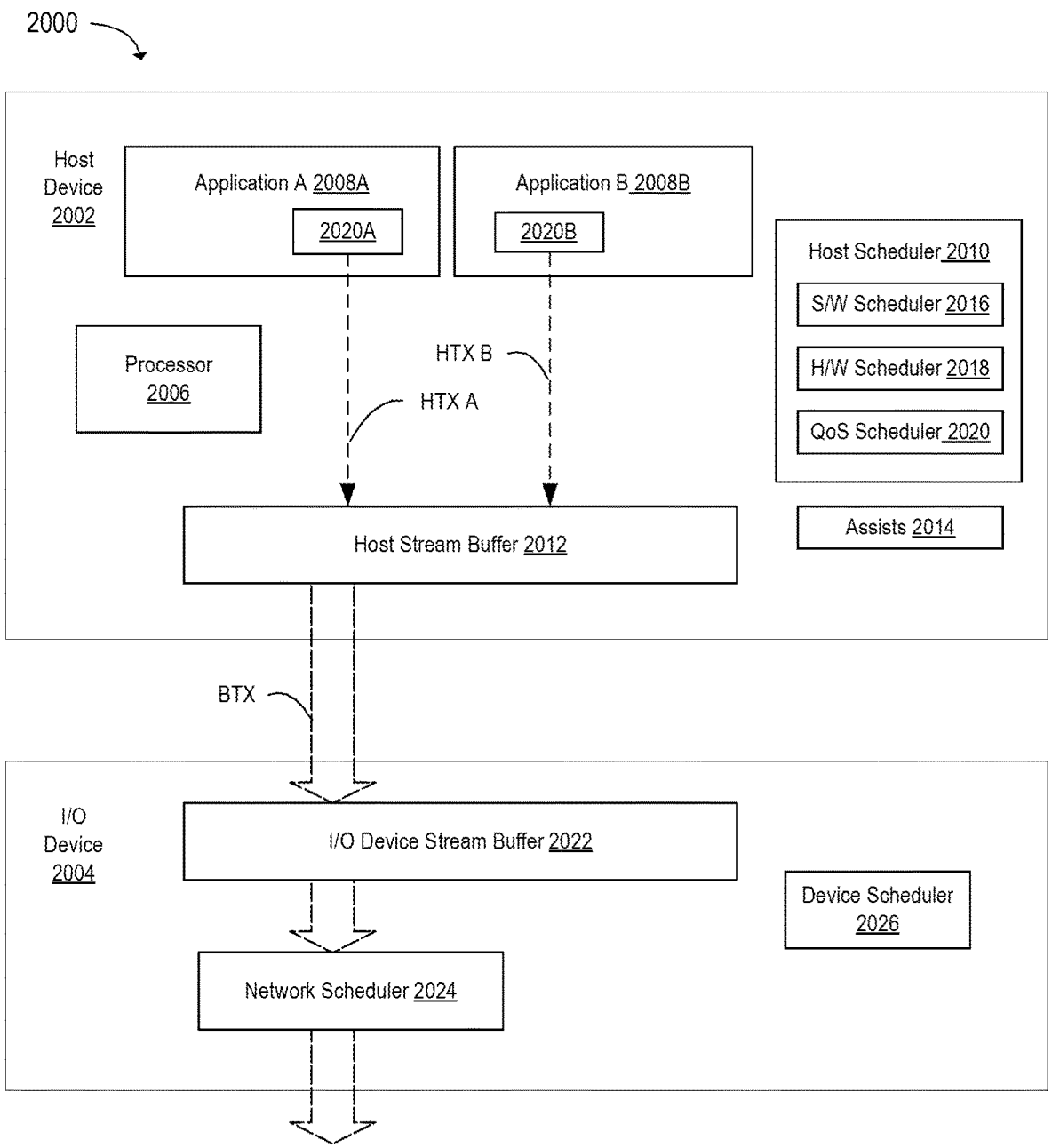
FIG. 16 is a block diagram representation of a system including an embodiment of the streaming subsystem.

Referring to FIG. 16, a block diagram representation of a system 2000 including an embodiment of a streaming subsystem 340 is shown. The system 2000 includes a host device 2002 configured to be communicatively coupled to an I/O device 2004 via the streaming subsystem 340. FIG. 16 illustrates the data paths associated with the streaming of data from the host device 2002 to the I/O device 2004. The host device 2002 may be similar to the CPU 320 in FIG. 1, the CPU 407 in FIG. 2, the CPU 520 in FIG. 3, the CPU 620 in FIG. 4, the host 702 in FIG. 5, and the host 802 in FIG. 6. The I/O device 2002 may be similar to the I/O device 330 in FIG. 1, the I/O device 408 in FIG. 2, the I/O device 530 in FIG. 3, the I/O device 630 in FIG. 4, the device 704 in FIG. 5, and the device 804 in FIG. 6.

In an embodiment, subsystem 340 may be implemented in a system 2000 including a Compute Express Link (CXL) link, through which Peripheral Component Interconnect Express (PCIe) traffic may flow. In an embodiment, the subsystem 340 may be implemented in a system 2000 including (Serializer/Deserializer) SerDes (physical layer) PHY type interfaces.

In an embodiment, the host device 2002 includes a processor 2006, a first application 2008A, a second application 2008B, a host scheduler 2010, and a host stream buffer 2012. The processor 2006 is configured to execute the applications 2008A, 2008B. In an embodiment, the host device 2002 includes hardware assists 2014. In an embodiment, the host scheduler 2010 includes a software (S/W) scheduler 2016 and a hardware (H/W) scheduler 2018. In an embodiment, the scheduler 2016 includes a software (S/W) scheduler 2016, a hardware (H/W) scheduler 2018, and a QoS scheduler 2020. In an embodiment, the first application 2008A includes streaming instruction set architecture (ISA) instructions 2020A and the second application 2008B includes streaming instruction set architecture (ISA) instructions 2020B. The streaming instruction set architecture (ISA) instructions 2020A, 2020B include data enqueue instructions and data dequeue instructions. In an embodiment, the streaming subsystem 340 includes the streaming instruction set architecture (ISA) instructions 2020A, 2020B, the host scheduler 2010, and the host stream buffer 2012. In an embodiment, the streaming subsystem 340 includes the streaming instruction set architecture (ISA) instructions 2020A, 2020B, the host scheduler 2010, the host stream buffer 2012, and the hardware assists 2014. While two applications are shown 2008A, 2008B in FIG. 16, alternative embodiments may include additional applications. In alternative embodiments, the host device 2002 may include additional components that facilitate the operation of the host device 2002.

The I/O device 2004 is configured to be communicatively coupled the host device 2002 via the streaming subsystem 340. In an embodiment, the I/O device 2004 includes an I/O device stream buffer 2022 and a network scheduler 2024. In an embodiment, the I/O device 2004 includes a I/O device stream buffer 2022, a network scheduler 2024, and a device scheduler 2026. In an embodiment, the streaming subsystem 340 includes the I/O device stream buffer 2022 and the network scheduler 2024. In an embodiment, the streaming subsystem 340 includes the I/O device stream buffer 2022, the network scheduler 2024, and the device scheduler 2026. In alternative embodiments, the I/O device 2004 may include additional components that facilitate the operation of the I/O device 2004.

When an application 2008A, 2008B has data to transmit to the I/O device 2004, the data is transmitted from the application 2008A, 2008B to the I/O device 2004 via a transmit streaming channel. The transmit streaming channel is a logical data path from an application 2008A, 2008B at the host device 2002 to the I/O device stream buffer 2022 of the I/O device 2004. The transmit streaming channel includes a host transmit streaming channel HTX A, HTX B from an application 2008A, 2008B to the host stream buffer 2012 and a buffer transmit streaming channel BTX from the host stream buffer 2012 to the I/O device stream buffer 2022. For example, a logical data path of a transmit streaming channel from Application A 2008A to the I/O device stream buffer 2022 includes the host transmit streaming channel HTX A and the buffer transmit streaming channel BTX. Similarly, an example of a logical data path of a transmit streaming channel from Application B 2008B to the I/O device stream buffer 2022 includes the host transmit streaming channel HTX B and the buffer transmit streaming channel BTX.

Figure 17:
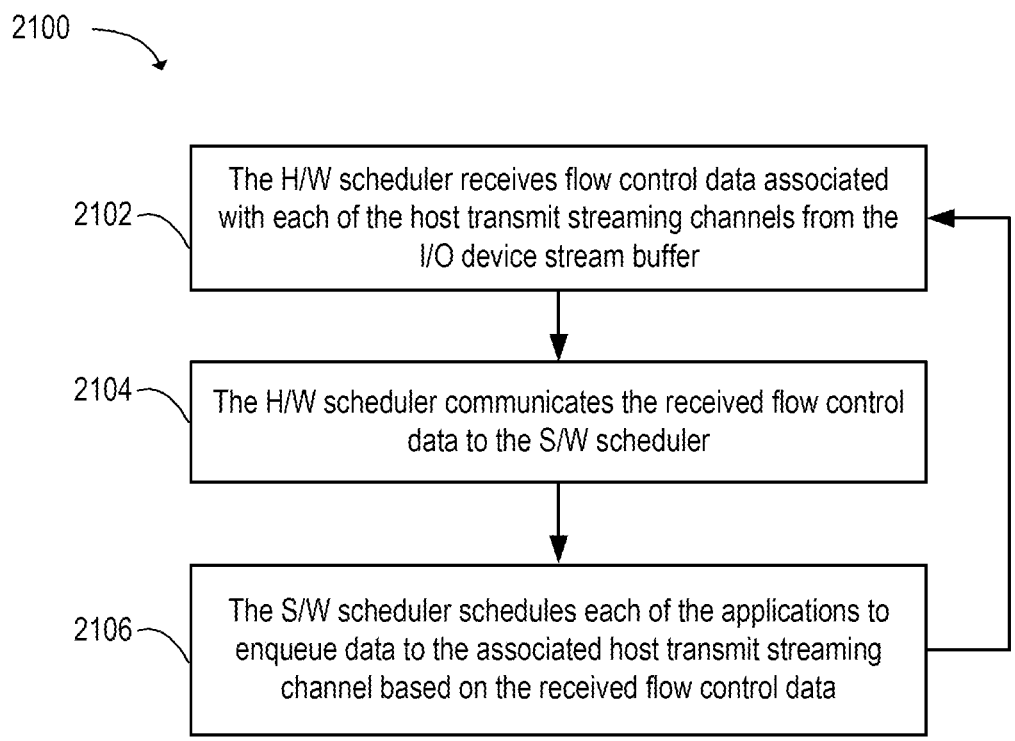
FIG. 17 is a flowchart representation of an embodiment of a method of implementing flow management is shown.

Referring to FIG. 17, a flowchart representation of an embodiment of a method 2100 of implementing flow management is shown. The method 2100 is performed by the streaming subsystem 340. The method 2100 may be performed by the streaming subsystem 340 in combination with additional components of the system 2000. The method 2100 may be performed by hardware circuitry, firmware, software, and/or combinations thereof.

Each of the applications 2008A, 2008B is associated with a transmit streaming channel to stream data from the application 2008A, 2008B to the I/O device stream buffer 2022.

Each transmit streaming channel is allocated a specific amount of buffer space in the I/O device stream buffer 2022. Each transmit streaming channel includes the host transmit streaming channel HTX A, HTX B and the buffer transmit streaming channel BTX. Each host transmit streaming channel HTX A, HTX B is allocated the specific amount of buffer space in the I/O device stream buffer 2022. Each host transmit channel HTX A, HTX B is assigned a specific number of credits associated with the allocated amount of buffer space in the I/O device stream buffer 2022. Each of the credits is associated with a unit of data.

At 2102, the H/W scheduler 2018 receives flow control data associated with each of the host transmit streaming channels HTX A, HTX B from the I/O device stream buffer 2022. The flow control data associated with each host transmit streaming channel HTX A, HTX B defines the space within the allocated amount of the buffer space in the I/O device stream buffer 2022 available to accept additional data from that host transmit streaming channel HTX A, HTX B. In an embodiment, the received flow control data for each host transmit streaming channel HTX A, HTX B is a number of credits that defines the space within the allocated amount of the buffer space in the I/O device stream buffer 2022 available to accept additional data from that host transmit streaming channel HTX A, HTX B. As data received via each of the host transmit streaming channels HTX A, HTX B is drained from the I/O device stream buffer 2022, the I/O device stream buffer 2022 updates the H/W scheduler 2018 with the number of credits available for each host transmit streaming channel HTX A, HTX B to accept additional data.

For example, if a host transmit streaming channel HTX A is assigned 100 credits and previously streamed 40 units of data equivalent to 40 credits from Application A 2008A to the I/O device stream buffer 2022 and 20 units of the 40 units of data has not yet been drained from the I/O device stream buffer 2022, the number of credits transmitted from the I/O device stream buffer 2022 to the H/W scheduler 2018 is 80 credits. The 80 credits indicates that the host transmit streaming channel HTX A can accept up to 80 units of data from Application A 2008A.

At 2104, the H/W scheduler 2018 communicates the received flow control data to the S/W scheduler 2016. In an embodiment, the H/W scheduler 2018 communicates the number of available credits associated with each of the host transmit streaming channels HTX A, HTX B received from the I/O device stream buffer 2022 to the S/W scheduler 2016.

At 2106, the S/W scheduler 2016 schedules each of the applications 2008A, 2008B to enqueue data to the associated host transmit streaming channel HTX A, HTX B based on the received flow control data. In an embodiment, the S/W scheduler 2016 schedules each of the applications 2008A, 2008B to enqueue data to the associated host transmit streaming channel HTX A, HTX B based on the number of available credits for the associated host transmit streaming channel HTX A, HTX B. The method then returns to 2102 where the process is repeated to implement balancing of the flow of data from each of the applications 2008A, 2008B to the I/O device stream buffer 2022.

Figure 18:
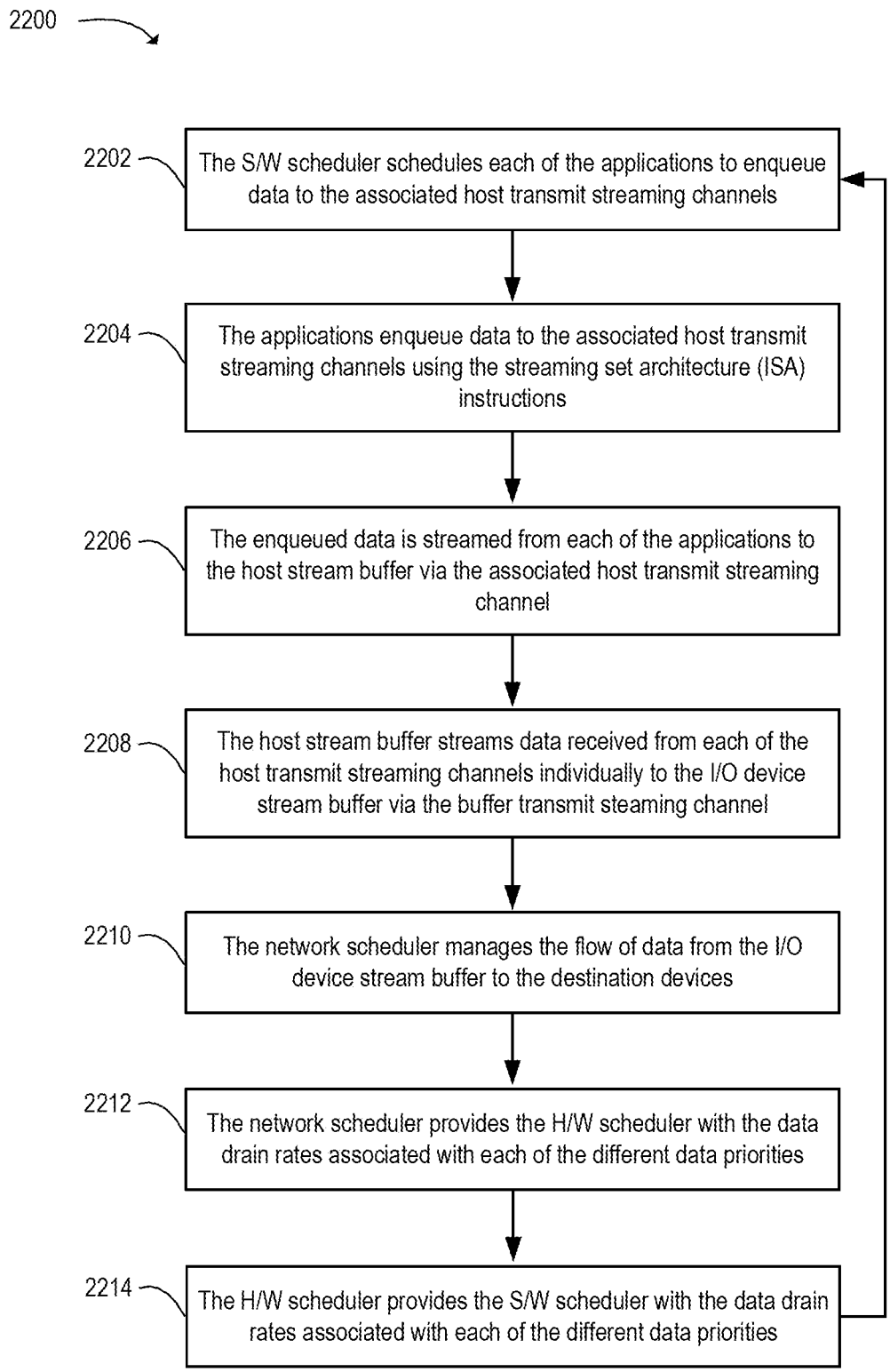
FIG. 18 is a flowchart representation of an embodiment of a method of streaming data from a host device to an I/O device.

Referring to FIG. 18, a flow chart representation of an embodiment of a method 2200 of streaming data from a host device 2002 to an I/O device 2004 via transmit streaming channels is shown. The method 2200 is performed by the streaming subsystem 340 when data is streamed from an application 2008A, 2008B at the host device 2002 to the I/O device streaming buffer 2022 of the I/O device 2004. The method 2200 may be performed by hardware circuitry, firmware, software, and/or combinations thereof.

At 2202, the S/W scheduler 2016 schedules Application A 2008A to enqueue data to the associated host transmit streaming channel HTX A and Application B 2008B to enqueue data to the associated host transmit streaming channel HTX B. The S/W scheduler 2016 schedules each of the applications 2008A, 2008B based on the flow control data associated with each of the host transmit streaming channels HTX A, HTX B received from the I/O device stream buffer 2022 via the H/W scheduler 2018. In embodiment, the S/W scheduler 2016 schedules each applications 2008A, 2008B based on the number of credits received from the I/O device stream buffer 2022 via the H/W scheduler 2018. The received credits for each of the host transmit streaming channels HTX A, HTX B defines the space within the allocated amount of buffer space for each of the host transmit streaming channels HTX A, HTX B in the I/O device stream buffer 2022 available to accept data.

In an embodiment, the available buffer space for the software is a function of available buffer space in the I/O device stream buffer 2022 and the host stream buffer 2012. The available buffer space for software to enqueue is equal to the total buffer in the host transmit streaming channel HTX A, HTX B—that is the sum of buffer available for each host transmit streaming channel HTX A, HTX B in the I/O device stream buffer 2022 plus the host stream buffer 2012. The H/W scheduler 2018 will account for and communicate with the S/W scheduler 2016 the total available space in the corresponding host transmit streaming channel HTX A, HTX B which is a function of buffer availability in the I/O device stream buffer 2022 plus the host stream buffer 2012. The host stream buffer 2012 will not send data to the I/O device 2004 via the buffer transmit steaming channel BTX for a certain host transmit streaming channel HTX A, HTX B unless credits indicating buffer availability are available from the I/O device stream buffer 2022 for that corresponding host transmit streaming channel HTX A, HTX B.

At 2204, the applications 2008A, 2008B enqueue data to the associated host transmit streaming channel HTX A, HTX B using the streaming set architecture (ISA) instructions 2020A, 2020B. For example, Application A 2008A enqueues data to the associated host transmit streaming channel HTX A using the streaming instruction set architecture (ISA) instructions 2020A and Application B 2008 B enqueues data to the associated host transmit streaming channel HTX B using the streaming instruction set architecture (ISA) instructions 2020B. In an embodiment, the applications 2008A, 2008B may be scheduled to concurrently enqueue data to the associated host transmit streaming channels HTX A, HTX B. In an embodiment, the applications 2008A, 2008B may be scheduled to enqueue data to the associated host transmit streaming channels HTX A, HTX B during overlapping time periods. In an embodiment, the applications 2008A, 2008B may be scheduled to enqueue data to the associated host transmit streaming channels HTX A, HTX B during non-overlapping time periods.

At 2206, the enqueued data is streamed from each of the applications 2008A, 2008B via the associated host transmit streaming channel HTX A, HTX B to the host stream buffer 2012. At 2208, the host stream buffer 2012 streams data received from each of the host transmit streaming channels HTX A, HTX B individually to the I/O device stream buffer 2022 via the buffer transmit steaming channel BTX. In an embodiment, the host stream buffer 2012 streams data received from each of the host transmit streaming channels HTX A, HTX B individually to the I/O device stream buffer 2022 via the buffer transmit steaming channel BTX in a round robin fashion.

In an embodiment, the host stream buffer 2012 streams data received from each of the host transmit streaming channels HTX A, HTX B individually to the I/O device stream buffer 2022 via the buffer transmit steaming channel BTX based on a priority associated with each of the host transmit streaming channels HTX A, HTX B. For example, if the host transmit streaming channel HTX B has a higher priority than the host transmit streaming channel HTX A, the host stream buffer 2012 streams the data received via the host transmit streaming channel HTX B to the I/O device stream buffer 2022 via the buffer transmit streaming channel BTX and then streams the data received via the host transmit streaming channel HTX A to the I/O device stream buffer 2022 via the buffer transmit streaming channel BTX. In an embodiment, the host scheduler 2010 establishes the priority associated with each of the host transmit streaming channels HTX A, HTX B. In an embodiment, the QoS scheduler 2020 establishes the priority associated with each of the host transmit streaming channels HTX A, HTX B. In an embodiment, each of the applications 2008A, 2008B is associated with a priority and the priority associated with each of the applications 2008A, 2008B is assigned to the associated host transmit streaming channel HTX A, HTX B. In alternative embodiments, the host stream buffer 2012 may stream data received from each of the host transmit streaming channels HTX A, HTX B individually to the I/O device stream buffer 2022 via the buffer transmit steaming channel BTX using a weighted round robin, a hybrid of strict priority and round robin, weighted fair queueing, a combination thereof or other scheduling mechanisms to ensure certain QoS across the buffer transmit streaming channel BTX or the overall system.

At 2210, the network scheduler 2024 manages the flow of data from the I/O device stream buffer 2022 to the destination devices. The network scheduler 2024 monitors the rate of flow of data from the I/O device stream buffer 2022 to the destination devices. The rate of flow of the data from the I/O device stream buffer 2022 may also be referred to as the data drain rate. In an embodiment, the network scheduler 2024 monitors the data drain rate associated with each of the different priorities of data. For example, the data received via the host transmit streaming channel HTX B may have a first priority and the data received via the host transmit streaming channel HTX A may have a second priority. The network scheduler 2024 monitors a first data drain rate associated with the flow of the data having the first priority from the I/O device stream buffer 2022 and monitors a second data drain rate associated with the flow of the data having the second priority from the I/O device stream buffer 2022. The data drain rates may be impacted, for example, by network congestion downstream of the I/O device 2004. In an embodiment, the data received via a host transmit streaming channel HTX A, HTX B has the same priority as that host transmit streaming channel HTX A, HTX B. In an embodiment, the priority associated with each of the host transmit streaming channels HTX A, HTX B is the same as the priority of the application 2008A, 2008 B associated with that host transmit streaming channel HTX A, HTX B.

At 2212, the network scheduler 2024 provides the H/W scheduler 2018 with the data drain rates associated with each of the different data priorities. At 2214, the H/W scheduler 2018 provides the data drain rates associated with each of the different data priorities to the S/W scheduler 2016. As mentioned above, the different host transmit streaming channels HTX A, HTX B have different priorities. Each of the different host transmit streaming channels HTX A, HTX B are associated with one of the applications 2008A, 2008B. The method 2200 then returns to 2202. The S/W scheduler 2016 schedules the enqueuing of data from each of the applications 2008A, 2008B based in part on the flow control data and the data drain rate associated with each of the data priorities. In an embodiment, the QoS scheduler 2020 reprioritizes streaming of the data received via the host transmit streaming channels HTX A, HTX B from the host stream buffer 2012 to the I/O device stream buffer 2022 based at least in part on the received data drain rates.

In an embodiment, the QoS scheduler 2020 determines whether the data enqueued from an application 2008A, 2008B to the associated host transmit streaming channel HTX A, HTX B falls below a channel data threshold. If the QoS scheduler 2020 determines that the data enqueued from an application 2008A, 2008B falls below the channel data threshold, the QoS scheduler 2020 dynamically adjusts the allocated amount of buffer space in the I/O device stream buffer 2022 to each of the host transmit streaming channels HTX A, HTX B. In an embodiment, the QoS scheduler 2020 allocates an amount of space in the I/O device stream buffer 2022 to each of the host transmit streaming channels HTX A, HTX B based on the priorities associated with each of the host transmit streaming channels HTX A, HTX B Embodiments may include various programable hardware assists 2014 for managing buffers and for performing various canonical operations. These canonical operations may include unpacking data from headers or payloads and placing it into a desired, e.g. deserialized format, or translating, e.g. from an unserialized format into a serialized format; for selecting data elements and composing new data elements from them (e.g., performing a gather or a scatter operation); and/or for presenting data to applications as logically contiguous streams while recording packet and message boundaries in auxiliary data structures. Such canonical operations obviate data transformations, may remove or hide management of various I/O descriptors, and may automate operations like compression, encryption, decompression, and decryption in hardware.

Figure 19:
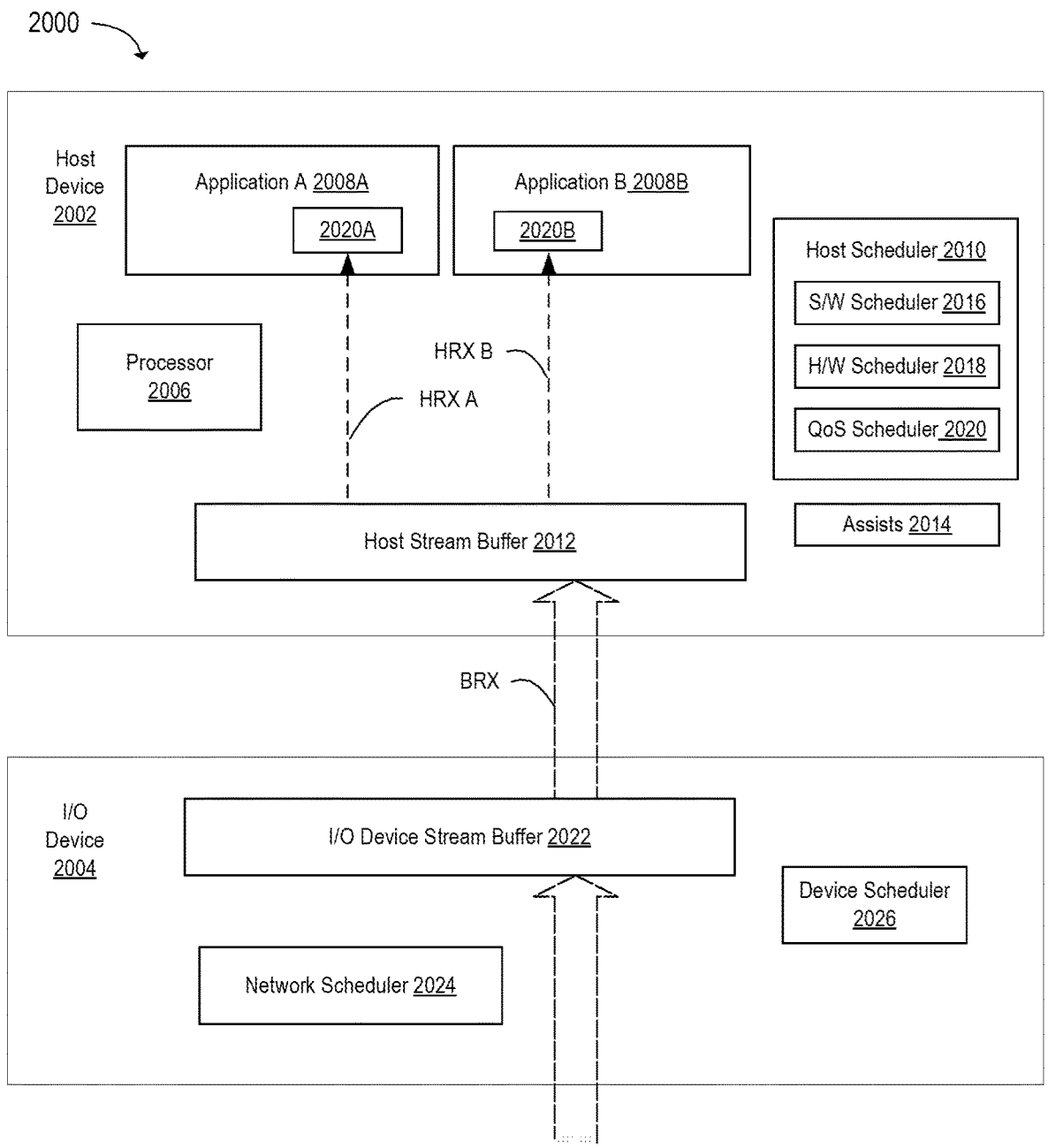
FIG. 19 is a block diagram representation of a system including an embodiment of the streaming subsystem.

Referring to FIG. 19, a block diagram representation of the system 2000 including an embodiment of the streaming subsystem 340 is shown. FIG. 19 illustrates the data paths associated with streaming data from the I/O device 2004 to the host device 2002. When data is received at the I/O device 2004 for an application 2008A, 2008B at the host device 2002, the received data is pushed to the I/O device stream buffer 2022. In various embodiments, the I/O device 2004 classifies the received data and identifies the packet streams associated with applications 2008A, 2008B and pushes data into the corresponding logical receive streaming channels of I/O device stream buffer 2022. The I/O device 2004 is programmed to classify the packet streams (packet classification rules) to its associated applications by the software that is aware of the streaming subsystem 340. This information is used to push data to corresponding streaming channels. Such packet classification mechanisms are used to associate packet streams or packet flows with applications and their corresponding streaming channels. These rules are programmed in the I/O device 2004 and the I/O device 2004 that implements the streaming channel includes mechanism (s) to push the classified packet streams per programmed rules to the corresponding logical streaming channels. The classification rules include and have awareness of logical streaming channels in the streaming subsystem 340 and include mechanisms to associate the packet streams to logical streaming channels.

The data is transmitted from the I/O device stream buffer 2022 to the application 2008A, 2008B via a receive streaming channel. A receive streaming channel is a logical data path from the I/O device stream buffer 2022 of the I/O device 2004 to an application 2008A, 2008B at the host device 2002. The receive streaming channel includes the buffer receive streaming channel BRX from the I/O device stream buffer 2022 to the host stream buffer 2012 and a host receive streaming channel HRX A, HRX B from the host stream buffer 2012 to the application 2008A, 2008B.

For example, a logical data path of a receive streaming channel from the I/O device stream buffer 2022 to Application A 2008A includes the buffer receive streaming channel BRX from the I/O device stream buffer 2022 to the host stream buffer 2012 and the host receive streaming channel HRX A from the host stream buffer 2012 to Application A 2008A. Similarly, an example of a logical data path of a receive streaming channel from the I/O device stream buffer 2022 to Application B 2008B includes the buffer receive streaming channel BRX from the I/O device stream buffer 2022 to the host stream buffer 2012 and the host receive streaming channel HRX B from the host stream buffer 2012 to Application B 2008B.

Each of the applications 2008A, 2008B is associated with a receive streaming channel that streams data from the I/O device stream buffer 2022 to the application 2008A, 2008B. Each receive streaming channel is allocated a specific amount of buffer space in the host stream buffer 2012. Each receive streaming channel includes the buffer receive streaming channel BRX and the host receive streaming channel HRX A, HRX B. Each host receive streaming channel HRX A, HRX B is allocated a specific amount of buffer space in the host stream buffer 2012. Each host receive streaming channel HRX A, HRX B is assigned a specific number of credits associated with the allocated amount of buffer space in the host stream buffer 2012. Each of the credits is associated with a unit of data.

The device scheduler 2026 receives flow control data associated with each of the host receive streaming channels HRX A, HRX B from the host stream buffer 2012. The flow control data associated with each host receive streaming channel HRX A, HRX B defines the space within the allocated amount of the buffer space in the host stream buffer 2012 available to accept data to stream to an application 2008A, 2008B via the associated host receive streaming channel HRX A, HRX B. In an embodiment, the received flow control data for each host receive streaming channel HRX A, HRX B is a number of credits that defines the space within the allocated amount of the buffer space in the host stream buffer 2012 available to accept additional data from the I/O device stream buffer 2022 to stream to an application 2008A, 2008B via the associated host receive streaming channel HRX A, HRX B. As data is received from the I/O device stream buffer 2022 at the host stream buffer 2012, each of the host receive streaming channels HRX A, HRX B drains the data from the host stream buffer 2012 as it streams the data to the associated application 2008A, 2008B. The host device stream buffer 2012 updates the device scheduler 2026 with the number of credits available for each host receive streaming channel HRX A, HRX B to accept additional data.

For example, a host receive streaming channel HRX A may be assigned 100 credits and 40 units of data equivalent to 40 credits may have been streamed from the I/O device stream buffer 2022 to the host stream buffer 2012 to stream to Application A. If 20 units of the 40 units of data have not been streamed from the host stream buffer 2012 to Application A 2008A via the host receive streaming channel HRX A, 20 units of the received 40 units of data will not have been drained from the host stream buffer 2012. The number of credits associated with the host receive streaming channel HRX A transmitted from the host stream buffer 2012 to the device scheduler 2026 is 80 credits. The 80 credits indicates that the host stream buffer 2012 can accept up to 80 units of data from the I/O device stream buffer 2022 to stream to Application A 2008A via the host receive streaming channel HRX A.

The data received at the I/O device stream buffer 2022 is associated with a specific destination application 2008A, 2008B. Each application 2008A, 2008B is associated with a host receive streaming channel HRX A, HRX B. Accordingly, the data associated with a specific application 2008A, 2008B is associated with the host receive streaming channel HRX A, HRX B for that application 2008A, 2008B. The device scheduler 2026 schedules the streaming of the data from the I/O device stream buffer 2022 to host stream buffer 2012 based on the number of available credits for the host receive streaming channel HRX A, HRX B that will be used to stream the data to the destination application 2008A, 2008B. The host stream buffer 2012 updates the device scheduler 2026 with flow control data on a periodic basis to implement balancing of the flow of data from the I/O device stream buffer 2022 to the destination application 2008A, 2008B.

Figure 20:
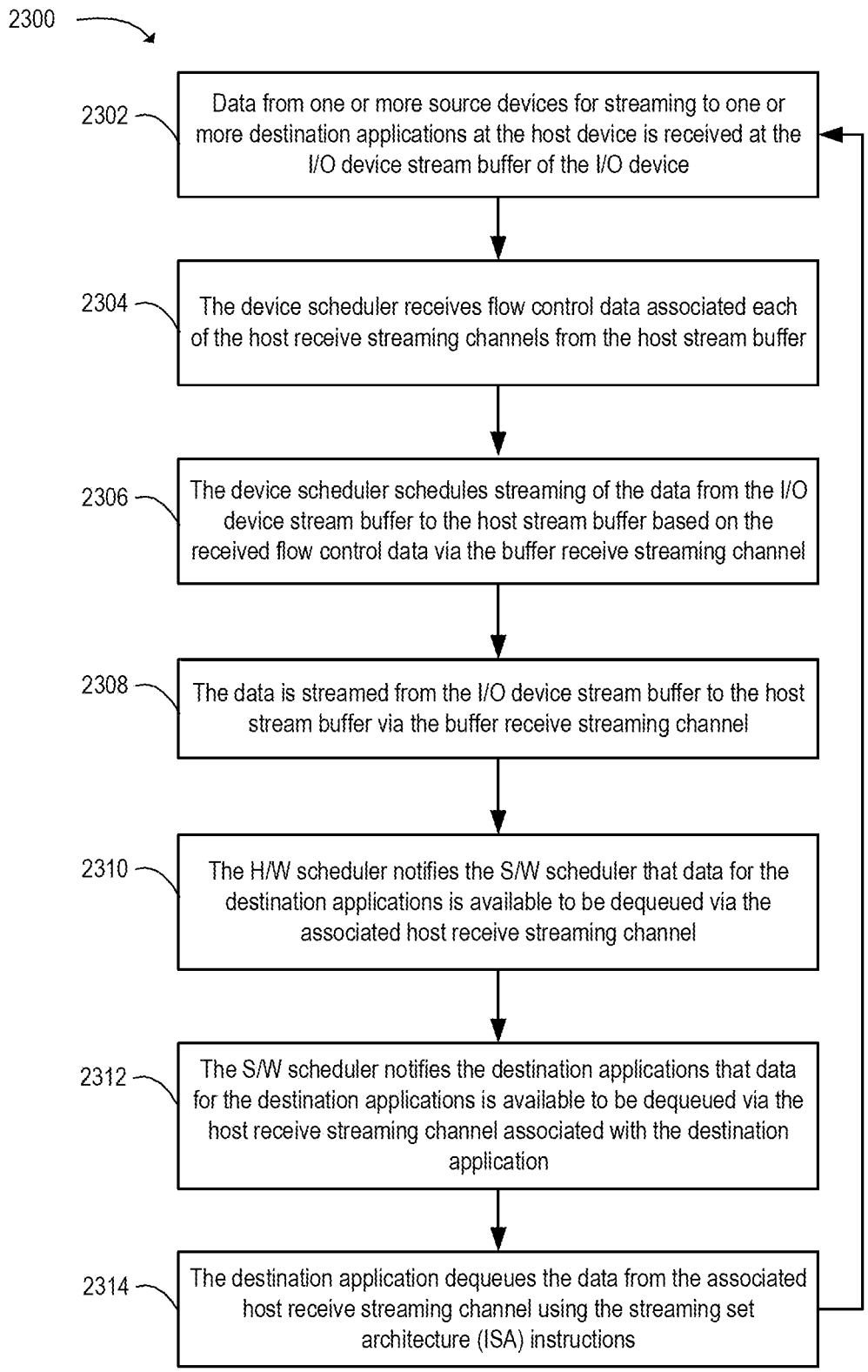
FIG. 20 is a flowchart representation of an embodiment of a method of streaming data from an I/O device to a host device.

Referring to FIG. 20 a flowchart representation of an embodiment of a method 2300 of streaming data from an I/O device 2004 to a host device 2002 via receive streaming channels is shown. The method 2300 is performed by the streaming subsystem 340 when data is streamed from the I/O device stream buffer 2022 to a target application 2008A, 2008B. The method 2300 may be performed by the streaming subsystem 340 in combination with additional components of the system 2000. The method 2300 may be performed by hardware circuitry, firmware, software, and/or combinations thereof.

At 2302, data from one or more source devices (not shown) for streaming to one or more destination applications 2008A, 2008B at the host device 2002 is received at the I/O device stream buffer 2022 of the I/O device 2004. In various embodiments, the source devices may be coupled to the I/O device 2004 through an interconnect (copper or fiber) or a network, such as Ethernet, or IB (Infiniband) or other HPC interconnect or system interconnect, or storage interconnect (e.g. Fibre Channel or FCOE) or through other network elements or network fabrics, crossbars. Examples of source devices include, but are not limited to, compute servers, switches, routers, load balancers, appliances, such as network or security appliances, including but not limited to systems with GPUs, FPGAs, accelerators, such as AI, crypto, and media encoders/decoders.

Each of the destination applications 2008A, 2008B is associated with a receive streaming channel. Each receive streaming channel is allocated a specific amount of buffer space in the host stream buffer 2012. Each receive streaming channel includes the buffer receive streaming channel BRX and the host receive streaming channel HRX A, HRX B. Each host receive streaming channel HRX A, HRX B is allocated the specific amount of buffer space in the host stream buffer 2012. The received data is streamed to the destination application via the associated receive streaming channel.

At 2304, the device scheduler 2026 receives flow control data associated with each of the host receive streaming channels HRX A, HRX B of the applications 2008A, 2008B from the host stream buffer 2012. In an embodiment, the flow control data is the number of credits available for each of the host receive streaming channels HRX A, HRX B of the applications 2008A, 2008B to accept additional data. The received credits for the host receive streaming channel HRX A, HRX B defines the space within the allocated amount of buffer space for the host receive streaming channel HRX A, HRX B in the host stream buffer 2012 available to accept additional data.

The device scheduler 2026 schedules the streaming of the data from the I/O device stream buffer 2022 to the host device stream buffer 2012 based on the received flow control data via the buffer receive streaming channel BRX at 2306. In an embodiment, the data associated with each of the destination applications 2008A, 2008B is streamed from the I/O device stream buffer 2022 to the host stream buffer 2012 in a round robin fashion.

In an embodiment, the data associated with each of the destination applications 2008A, 2008B is streamed from the I/O device stream buffer 2022 to the host stream buffer 2012 in an order associated with a priority of the destination application 2008A, 2008B. For example, if a first block of data is received at the I/O device stream buffer 2022 for streaming to destination Application A 2008A, a second block of data is received at the I/O device stream buffer 2022 for streaming to destination Application B 2008B, and Application B 2008B is associated with a higher priority that Application A, 2008A, the second block of data is scheduled to be streamed from the I/O device stream buffer 2022 to the host stream buffer 2012 before the first block of data is scheduled to be streamed from the I/O device stream buffer 2022 to the host stream buffer 2012. In an embodiment, the device scheduler 2026 identifies the priority of the destination applications 2008A, 2008B associated with received data and schedules the streaming of the received data from the I/O device stream buffer 2022 to the host stream buffer 2012 in accordance with the identified priority. In alternative embodiments, I/O device stream buffer 2022 may stream the data to the host stream buffer 2012 via the buffer receive streaming channel BRX using a weighted round robin, a hybrid of strict priority and round robin, weighted fair queuing, a combination thereof or other scheduling mechanisms to ensure certain QoS across the buffer receive streaming channel BRX or the overall system.

At 2308, the data is streamed from the I/O device stream buffer 2022 to the host stream buffer 2012 via the buffer receive streaming channel BRX. At 2310, the H/W scheduler 2018 notifies the S/W scheduler 2016 that data for the destination applications 2008A, 2008B is available to be dequeued via the associated host receive streaming channel HRX A, HRX B. In an alternative embodiment, the device scheduler 2026 notifies the H/W scheduler 2018 upon scheduling the streaming of data from the I/O device stream buffer 2022 to the host stream buffer 2012 and the H/W scheduler 2018 notifies the S/W scheduler 2016 that data associated with a destination application 2008A, 2008B has been scheduled for streaming to from the I/O device stream buffer 2022 to the host stream buffer 2012.

At 2312, the S/W scheduler 2016 notifies the destination applications 2008A, 2008B that data for the destination applications 2008A, 2008B is available to be dequeued by the destination applications 2008A, 2008B from the associated host receiving streaming channel HRX A, HRX B. At 2314, the destination application 2008A, 2008B dequeues the data from the associated host receiving streaming channel HRX A, HRX B using the streaming instruction set architecture (ISA) instructions 2020A, 2020B. In an embodiment, the applications 2008A, 2008B may concurrently dequeue data from the associated host receive streaming channels HRX A, HRX B. In an embodiment, the applications 2008A, 2008B may dequeue data from the associated host receive streaming channels HRX A, HRX B during overlapping time periods. In an embodiment, the applications 2008A, 2008B may dequeue data from the associated host receive streaming channels HRX A, HRX B during non-overlapping time periods. The method 2300 then returns to 2302.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Figure 21:
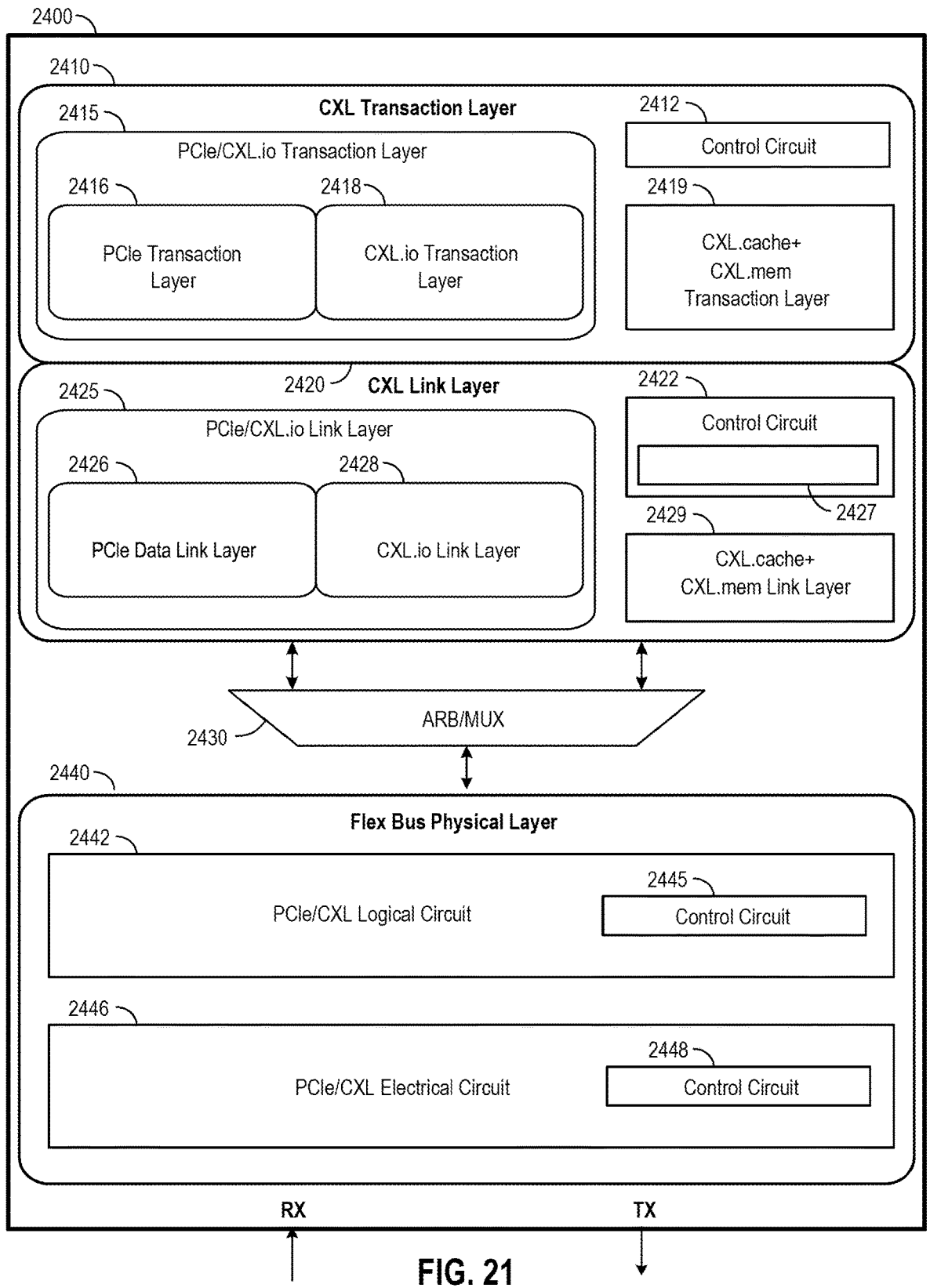
FIG. 21 is a block diagram representation of an interface circuit in accordance with an embodiment.

Referring to FIG. 21 a block diagram representation of an interface circuit in accordance with an embodiment is shown. Interface circuit 2400 is configured to interface with a given device such as a transmitter and/or receiver to a link. In the embodiment shown in FIG. 21, interface circuit 2400 is a CXL interface circuit. The CXL interface circuit 2400 includes a transaction layer 2410, a link layer 2420, and a physical layer 2440. With reference to CXL transaction layer 2410, various components are included to enable transaction layer processing for PCIe/CXL.io communications and CXL.cache and CXL.memory transactions. The PCIe/CXL.io transaction layer 2415 includes a control circuit 2412 configured to perform various transaction layer control operations. Transaction layer 2410 includes a PCIe transaction layer 2416 and additional circuitry 2418 for handling enhancements to PCIe transaction layer 2416 for handling CXL.io transactions. In turn, CXL.cache and CXL.memory transaction layer 2419 may perform transaction layer processing for these protocols.

With reference to CXL link layer 2420, various components are included to enable link layer processing for PCIe/CXL.io communications and CXL.cache and CXL.memory transactions. More particularly, a PCIe/CXL.io link layer 2425 includes a control circuit 2422. In embodiments herein, control circuit 2422 may configure the various components and/or itself perform link IDE operations, including providing both data integrity and encryption/decryption as described herein.

In an embodiment, control circuit 2422 may include or be coupled to one or more configuration registers 2427. Such configuration registers may include one or more fields to control various features including a pCRC mechanism as described herein. In an embodiment, configuration registers 2427 may include a CXL IDE defeature register, which may include a pCRC enable/disable indicator. In one implementation, a logic "1" value may disable enhancing the MAC generation with plaintext CRC, and when reset to a logic "0" value, this pCRC mechanism may be enabled by default.

As further shown, link layer 2420 also includes a PCIe data link layer 2426 and additional circuitry 2428 for handling enhancements to PCIe data link layer 2426 for handling CXL.io transactions. In turn, CXL.cache and CXL.memory link layer 2429 may perform link layer processing for these protocols.

With further reference to FIG. 21, link layer 2420 is coupled to an arbiter/multiplexer 2430 to receive incoming data streams from link layer 2420 and select a data stream (or portion thereof) for communication to a physical layer 2440.

In an embodiment, physical layer 2440 may be a physical layer to further process incoming data packets for communication on a physical link, which in an embodiment may be a flex bus. As illustrated, physical layer 2440 includes a PCIe/CXL logical circuit 2442 and a PCIe/CXL electrical circuit 2446. These circuits include respective control circuits 2445, 2448 to control processing within physical layer 2440. After all such processing is completed, outgoing transaction layer data packets may be communicated on the link. Similarly, incoming transaction layer data packets may be received within physical layer 2440 and processed within the communication stack of interface circuit 2400. Understand while shown at this high level in the embodiment of FIG. 21, many variations and alternatives are possible.

Figure 22:
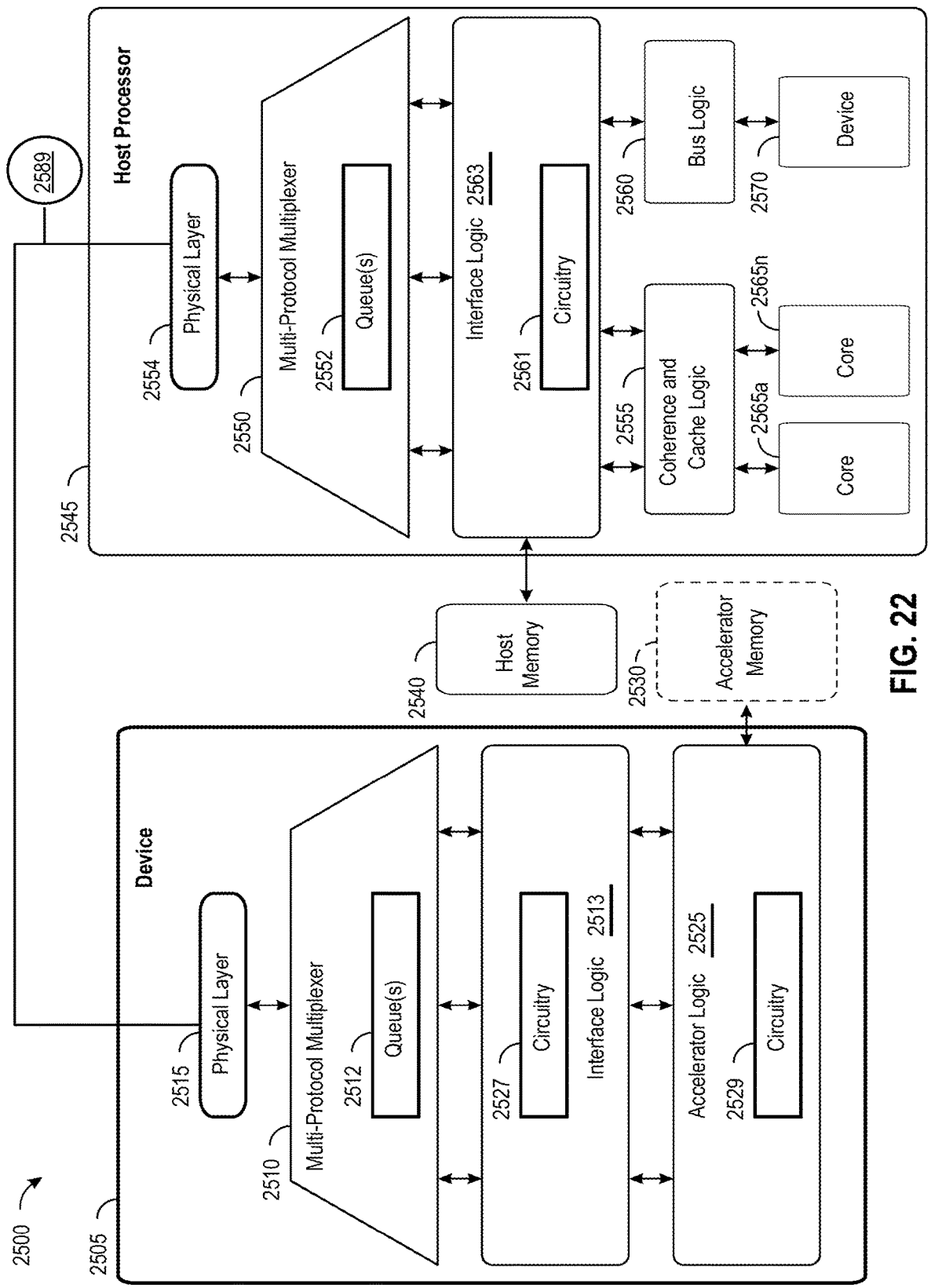
FIG. 22 is a block diagram representation of a system in accordance with an embodiment.

FIG. 22 is a block diagram representation of a system in accordance with an embodiment. As shown in FIG. 22 a device 2505 may be an accelerator or processor device coupled to a host processor 2545 via an interconnect 2589, which may be single interconnect, bus, trace, and so forth. Device 2505 and host processor 2545 may communicate over link 2589 to enable data and messages to pass therebetween. The host processor 2545 may be similar to the CPU 320 in FIG. 1, the CPU 407 in FIG. 2, the CPU 520 in FIG. 3, the CPU 620 in FIG. 4, the host 702 in FIG. 5, the host 802 in FIG. 6, and the host device 2002 in FIG. 16. In an embodiment, the host processor 2545 may be a Graphics Processing Unit (GPU). In an embodiment, one or more PCIe devices may directly read from and/or write to GPU memory. In an embodiment, the GPU and the one or more PCIe device may be under the same PCIe root complex. The device 2505 may be similar to the I/O device 330 in FIG. 1, the I/O device 408 in FIG. 2, the I/O device 530 in FIG. 3, the I/O device 630 in FIG. 4, the device 704 in FIG. 5, the device 804 in FIG. 6 and I/O device 2002 in FIG. 16. In some embodiments, link 2589 may be operable to support multiple protocols and communication of data and messages via the multiple interconnect protocols, including a CXL protocol as described herein. For example, link 2589 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 2505 may include accelerator logic 2525 including circuitry 2529. In some instances, accelerator logic 2525 and circuitry 2529 may provide processing and memory capabilities. Examples of device 2505 may include producer-consumer devices such as a graphics or other specialized accelerator, producer-consumer plus devices, software-assisted device memory devices, autonomous device memory devices, and giant cache devices. In some cases, accelerator logic 2525 may couple to an optional accelerator memory 2530. Accelerator logic 2525 and circuitry 2529 may provide the processing and memory capabilities based on the device. For example, accelerator logic 2525 and circuitry 2529 may communicate using, for example, a coherent interconnect protocol for various functions, such as coherent requests and memory flows with host processor 2545 via interface logic 2513 and circuitry 2527. Interface logic 2513 and circuitry 2527 may determine an interconnect protocol based on the messages and data for communication. Understand that with embodiments herein, circuitry 2527 may include link IDE circuitry to perform both data integrity and data encryption/decryption as described herein. In some embodiments, interface logic 2513 may be coupled to a multi-protocol multiplexer 2510 having one or more protocol queues 2512 to send and receive messages and data with host processor 2545. Protocol queue 2512 may be protocol specific such that each interconnect protocol may be associated with a particular protocol queue. Multiplexer 2510 may also implement arbitration circuitry to arbitrate between communications of different protocols and provide selected communications to a physical layer 2515.

In various embodiments, host processor 2545 may be a main processor such as a CPU. Host processor 2545 may be coupled to a host memory 2540 and may include coherence logic (or coherence and cache logic) 2555, which may include a cache hierarchy. Coherence logic 2555 may communicate using various interconnects with interface logic 2563 including circuitry 2561 and one or more cores 2565a-n. In some embodiments, coherence logic 2555 may enable communication via one or more of a coherent interconnect protocol and a memory interconnect protocol.

In various embodiments, host processor 2540 may include a device 2570 to communicate with a bus logic 2560 over an interconnect. In some embodiments, device 2570 may be an I/O device, such as a PCIe I/O device. In other cases, one or more external devices such as PCIe devices may couple to bus logic 2570.

In embodiments, host processor 2545 may include interface logic 2563 and circuitry 2561 to enable multi-protocol communication between the components of host processor 2545 and device 2505. Interface logic 2563 and circuitry 2561 may process and enable communication of messages and data between host processor 2545 and device 2505 in accordance with one or more interconnect protocols, e.g., a non-coherent interconnect protocol, a coherent interconnect, protocol, and a memory interconnect protocol, dynamically. For example, interface logic 2563 and circuitry 2561 may determine a message type for each message and determine which interconnect protocol of a plurality of interconnect protocols to process each of the messages. Different interconnect protocols may be utilized to process the messages. In addition, circuitry 2561 may include link IDE circuitry to perform both data integrity and data encryption/decryption as described herein.

In some embodiments, interface logic 2563 may be coupled to a multi-protocol multiplexer 2550 having one or more protocol queues 2552 to send and receive messages and data with device 2505. Protocol queue 2552 may be protocol specific such that each interconnect protocol may be associated with a particular protocol queue. Multiplexer 2550 may also implement arbitration circuitry to arbitrate between communications of different protocols and provide selected communications to a physical layer 2554.

The following examples pertain to further embodiments.

In one example, an apparatus includes: a processor to execute at least a first application and a second application, the first application associated with a first transmit streaming channel to stream first data from the first application to a device stream buffer of a device, wherein the first transmit streaming channel has a first allocated amount of buffer space in the device stream buffer; and a scheduler coupled to the processor, the scheduler to schedule the first application to enqueue the first data to the first transmit streaming channel based at least in part on availability of space in the first allocated amount of buffer space in the device stream buffer.

In an example, the scheduler is further to: receive flow control data associated with the availability of space in the first allocated amount of buffer space in the device stream buffer from the device; and schedule the first application to enqueue the first data to the first transmit streaming channel based at least in part on the flow control data.

In an example, the second application is associated with a second transmit streaming channel to stream second data from the second application to the device stream buffer, the second transmit streaming channel having a second allocated amount of buffer space in the device stream buffer; and the apparatus further includes a host stream buffer to: receive the first and second data via the first and second transmit streaming channels, respectively; and stream the first and second data from the host stream buffer to the device stream buffer via a buffer transmit streaming channel.

In an example, the scheduler is further to prioritize streaming of the first data and the second data from the host stream buffer to the device stream buffer via the buffer transmit streaming channel based at least in part on a first priority associated with the first application and a second priority associated with the second application.\

In an example, the scheduler is further to receive a first data drain rate from the device, the first data drain rate associated with draining of the first data from the device stream buffer; receive a second data drain rate from the device, the second data drain rate associated with draining of the second data from the device stream buffer; and reprioritize streaming of the first data and the second data from the host stream buffer to the device stream buffer based at least in part on the first and second data drain rates.

In an example, the scheduler is further to receive a first data drain rate from the device, the first data drain rate associated with draining of the first data from the device stream buffer; and schedule the enqueue of the first data from the first application to the first transmit streaming channel based at least in part on the first data drain rate.

In an example, the second application is associated with a second transmit streaming channel to stream second data from the second application to the device stream buffer and the second transmit streaming channel having a second allocated amount of buffer space in the device stream buffer; and the scheduler is further to: determine whether the first data provided by the first application falls below a channel data threshold; and dynamically adjust the first allocated amount of buffer space in the device stream buffer to the first transmit streaming channel and the second allocated amount of buffer space in the device stream buffer to the second transmit streaming channel based at least in part on the determination.

In an example, the first application is associated with a first priority and the second application is associated with a second priority, the second application associated with a second transmit streaming channel to stream second data from the second application to the device stream buffer and having a second allocated amount of buffer space in the device stream buffer; and the scheduler is further to: allocate the first allocated amount of the buffer space in the device stream buffer to the first transmit streaming channel based at least in part on the first priority; and allocate the second allocated amount of the buffer space in the device stream buffer to the second transmit streaming channel based at least in part on the second priority.

In an example, the apparatus further includes a host stream buffer to receive third data associated with the first application from the device via a first receive streaming channel, the first receive streaming channel being associated with the first application and having a first allocated amount of buffer space in the host stream buffer.

In an example, the host buffer is to transmit flow control data associated with availability of space in the first allocated amount of buffer space in the host stream buffer to the device.

In an example, the scheduler is further to schedule dequeue of the third data by the first application from the first receive streaming channel.

In one example, a machine-readable medium includes instructions stored thereon, which if performed by a machine, cause the machine to: receive first data associated with a first application at a device stream buffer of a device, the first application associated with a first receive streaming channel to stream the first data from the device stream buffer to the first application at a host device via a host stream buffer, the first receive streaming channel having a first allocated amount of buffer space in the host stream buffer; and schedule streaming of the first data from the device stream buffer to the first application via the first receive streaming channel based at least in part on availability of space in the first allocated amount of buffer space in the host stream buffer.

In an example, the machine-readable medium further includes instructions to cause the machine to: receive flow control data associated with availability of space in the first allocated amount of buffer space in the host stream buffer from the host device; and schedule streaming of the first data from the device stream buffer to the host stream buffer based at least in part on the flow control data.

In an example, the machine-readable medium further includes instructions to cause the machine to: receive second data associated with a second application at the device stream buffer, the second application associated with a second receive streaming channel to stream the second data from the device stream buffer to the second application at the host device via the host stream buffer, the second receive streaming channel having a second allocated amount of buffer space in the host stream buffer; and schedule streaming of the first data and the second data from the device stream buffer to the host stream buffer via a buffer receive streaming channel based at least in part on first and second priorities of the first and second applications, respectively.

In an example, the machine-readable medium further includes instructions to cause the machine to: receive third data from the first application via a first transmit streaming channel at the device stream buffer, the first transmit streaming channel being associated with the first application and having a first allocated amount of buffer space in the device stream buffer.

In an example, the machine-readable medium further includes instructions to cause the machine to transmit flow control data associated with availability of space in the first allocated amount of buffer space in the device stream buffer to the host.

In one example, a system includes a device and a host coupled to the device. The device includes a device stream buffer. The host includes a processor to execute at least a first application and a second application, the first application associated with a first transmit streaming channel to stream first data from the first application to the device stream buffer, the first transmit streaming channel having a first allocated amount of buffer space in the device stream buffer;

a host stream buffer; and a host scheduler coupled to the processor, the host scheduler to schedule enqueue of the first data from the first application to the first transmit streaming channel based at least in part on availability of space in the first allocated amount of buffer space in the device stream buffer.

In an example, the host scheduler is further to: receive flow control data associated with availability of space in the first allocated amount of buffer space in the device stream buffer; and schedule the enqueue of the first data from the first application to the first transmit streaming channel based at least in part on the flow control data.

In an example, the system includes a device scheduler, wherein the device stream buffer is to receive third data associated with the first application, the first application associated with a first receive streaming channel to stream the third data from the device stream buffer to the first application, the first receive streaming channel having a first allocated amount of buffer space in the host stream buffer; and the device scheduler is to scheduler streaming of the third data from the device stream buffer to the host stream buffer based at least in part on availability of space in the first allocated amount of buffer space in the host stream buffer.

In an example, the device scheduler is further to receive flow control data associated with the availability of space in the first allocated amount of buffer space in the host stream buffer; and schedule streaming of the third data from the device stream buffer to the host stream buffer based at least in part on the flow control data.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A central processing unit (CPU) comprising:
   a processor comprising a plurality of cores;
   one or more cache memories coupled to the plurality of cores;
   the processor to execute at least a first application and a second application, the first application to directly access a first transmit streaming channel of a plurality of transmit streaming channels of a host stream buffer implemented at least in part in at least one of the one or more cache memories, the host stream buffer exposed to the first application and the second application as the plurality of transmit streaming channels, to stream first data from the first application to a device stream buffer of a device, wherein the first transmit streaming channel has a first allocated amount of buffer space in the device stream buffer; and
   a scheduler coupled to the processor, the scheduler to schedule the first application to enqueue the first data to the first transmit streaming channel based at least in part on availability of space in the first allocated amount of buffer space in the device stream buffer.

2. The CPU of claim 1, wherein the scheduler is further to:
   receive flow control data associated with the availability of space in the first allocated amount of buffer space in the device stream buffer from the device; and
   schedule the first application to enqueue the first data to the first transmit streaming channel based at least in part on the flow control data.

3. The CPU of claim 1, wherein the second application is to directly access a second transmit streaming channel of the plurality of transmit streaming channels to stream second data from the second application to the device stream buffer, the second transmit streaming channel having a second allocated amount of buffer space in the device stream buffer; and
   wherein host stream buffer is to:

receive the first and second data via the first and second transmit streaming channels, respectively; and stream the first and second data from the host stream buffer to the device stream buffer via a buffer transmit streaming channel.

4. The CPU of claim 3, wherein the scheduler is further to prioritize streaming of the first data and the second data from the host stream buffer to the device stream buffer via the buffer transmit streaming channel based at least in part on a first priority associated with the first application and a second priority associated with the second application.

5. The CPU of claim 3, wherein the scheduler is further to:

receive a first data drain rate from the device, the first data drain rate associated with draining of the first data from the device stream buffer;

receive a second data drain rate from the device, the second data drain rate associated with draining of the second data from the device stream buffer; and reprioritize streaming of the first data and the second data from the host stream buffer to the device stream buffer based at least in part on the first and second data drain rates.

6. The CPU of claim 1, wherein the scheduler is further to:

receive a first data drain rate from the device, the first data drain rate associated with draining of the first data from the device stream buffer; and schedule the enqueue of the first data from the first application to the first transmit streaming channel based at least in part on the first data drain rate.

7. The CPU of claim 1, wherein the second application is to directly access a second transmit streaming channel of the plurality of transmit streaming channels to stream second data from the second application to the device stream buffer and the second transmit streaming channel having a second allocated amount of buffer space in the device stream buffer; and the scheduler is further to:

determine whether the first data provided by the first application falls below a channel data threshold; and dynamically adjust the first allocated amount of buffer space in the device stream buffer to the first transmit streaming channel and the second allocated amount of buffer space in the device stream buffer to the second transmit streaming channel based at least in part on the determination.

8. The CPU of claim 1, wherein the first application is associated with a first priority and the second application is associated with a second priority, the second application associated with a second transmit streaming channel of the plurality of transmit streaming channels to stream second data from the second application to the device stream buffer and having a second allocated amount of buffer space in the device stream buffer; and the scheduler is further to:

allocate the first allocated amount of the buffer space in the device stream buffer to the first transmit streaming channel based at least in part on the first priority; and allocate the second allocated amount of the buffer space in the device stream buffer to the second transmit streaming channel based at least in part on the second priority.

9. The CPU of claim 1, wherein the host stream buffer is to receive third data associated with the first application from the device via a first receive streaming channel, the first receive streaming channel being associated with the first application and having a first allocated amount of buffer space in the host stream buffer.

10. The CPU of claim 9, wherein the host stream buffer is to transmit flow control data associated with availability of space in the first allocated amount of buffer space in the host stream buffer to the device.

11. The CPU of claim 9, wherein the scheduler is further to schedule dequeue of the third data by the first application from the first receive streaming channel.

12. The CPU of claim 1, wherein the first application is to issue an enqueue streaming instruction set architecture (ISA) instruction to cause the first data to be enqueued into the first transmit streaming channel.

13. The CPU of claim 1, wherein the first application is to issue a dequeue streaming instruction set architecture (ISA) instruction to cause second data to be dequeued from the first transmit streaming channel.

* * * * *